United States Patent
Zamansky et al.

(10) Patent No.: US 9,365,784 B2
(45) Date of Patent: Jun. 14, 2016

(54) METHOD OF REDUCING OXYGEN REQUIREMENT OF A COAL GASIFIER

(71) Applicant: General Electric Company, Schenectady, NY (US)

(72) Inventors: Vladimir Zamansky, Niskayuna, NY (US); Vitali Victor Lissianski, Schenectady, NY (US); Boris Nikolaevich Eiteneer, Niskayuna, NY (US); Wei Wei, Summit, NJ (US); Ravichandra Srinivasa Jupudi, Bangalore (IN); Ramanathan Subramanian, Yuma, AZ (US)

(73) Assignee: General Electric Company, Niskayuna, NY (US)

(*) Notice: Subject to any disclaimer, the term of this patent is extended or adjusted under 35 U.S.C. 154(b) by 250 days.

(21) Appl. No.: 14/056,528

(22) Filed: Oct. 17, 2013

(65) Prior Publication Data

US 2014/0059930 A1  Mar. 6, 2014

Related U.S. Application Data

(62) Division of application No. 12/337,762, filed on Dec. 18, 2008, now Pat. No. 8,617,271.

(51) Int. Cl.
*C01B 3/36* (2006.01)
*C10J 3/72* (2006.01)
*C10J 3/46* (2006.01)

(52) U.S. Cl.
CPC ..... *C10J 3/721* (2013.01); *C10J 3/466* (2013.01); *C10J 2300/0956* (2013.01); *C10J 2300/0959* (2013.01); *C10J 2300/0976* (2013.01); *C10J 2300/1223* (2013.01); *Y02E 20/18* (2013.01)

(58) Field of Classification Search
CPC .......... C10J 2300/0956; C10J 2300/0959; C10J 2200/152; C10J 2300/0973; C10J 3/16
See application file for complete search history.

(56) References Cited

U.S. PATENT DOCUMENTS 2,311,140 A  2/1939  Totzek et al.
2,805,188 A  10/1952 Josenhans (Continued)

FOREIGN PATENT DOCUMENTS

CN  101225318 A  7/2008
JP  2005265299 A  9/2005

(Continued)

OTHER PUBLICATIONS

Klass, "Biomass for Renewable Energy, Fuels, and Chemicals", pp. 289-290, Jul. 9, 1998.

(Continued)

*Primary Examiner* — Imran Akram
(74) *Attorney, Agent, or Firm* — Francis T. Coppa

(57) ABSTRACT

A coal gasifier is retrofitted to achieve multiple advantages such as reduced oxygen consumption, reduced CO2 and NOx emissions, better H:C ratio, better carbon conversion etc. This is achieved by dividing the coal into at least two zones and modifying the gasifier and operating it as described. The coal is injected into a first zone, configured to devolatilize a substantial portion of the injected coal to produce coal char and volatiles. The operation is tuned to substantially consume the oxidant injected in the first zone. A low-calorific-value, high oxidant feedstock is injected in second zone of the gasifier. The devolatilization of the low-calorific-value, high oxidant content feedstock provides the oxygen containing compounds which gasify at least a portion of the coal char generated in the first zone.

15 Claims, 17 Drawing Sheets

(56) References Cited

U.S. PATENT DOCUMENTS

| | | | |
|---|---|---|---|
| 2,699,384 A | 1/1955 | Perry et al. | |
| 2,879,148 A | 3/1959 | Atwell | |
| 3,945,809 A | 3/1976 | Donath | |
| 3,951,615 A | 4/1976 | Gernhardt et al. | |
| 3,985,519 A * | 10/1976 | Kalina | C10J 3/54 252/373 |
| 4,303,415 A * | 12/1981 | Summers | C10J 3/00 201/44 |
| 4,323,446 A * | 4/1982 | Chervenak | C10G 1/02 208/407 |
| 4,329,932 A | 5/1982 | Takahashi | |
| 4,443,228 A | 4/1984 | Schlinger | |
| 4,480,559 A | 11/1984 | Blaskowski | |
| 4,647,294 A | 3/1987 | Jahnke | |
| 5,622,534 A | 4/1997 | Andrus | |
| 6,085,674 A | 7/2000 | Ashworth | |
| 6,453,830 B1 | 9/2002 | Zauderer | |
| 6,694,900 B2 | 2/2004 | Lissianski et al. | |
| 6,699,029 B2 | 3/2004 | Kobayashi et al. | |
| 6,902,711 B1 | 6/2005 | Fujimura et al. | |
| 6,911,058 B2 * | 6/2005 | Calderon | C10J 3/08 202/118 |
| 6,986,311 B2 | 1/2006 | Vatsky et al. | |
| 8,523,963 B2 | 9/2013 | Bullinger et al. | |
| 2002/0113228 A1 * | 8/2002 | Kim | C10J 3/16 252/373 |
| 2007/0289216 A1 | 12/2007 | Tsangaris et al. | |
| 2010/0146857 A1 | 6/2010 | Zamansky et al. | |

FOREIGN PATENT DOCUMENTS

| | | |
|---|---|---|
| JP | 2005291534 A | 10/2005 |
| WO | 02/46331 A1 | 6/2002 |
| WO | 02/48292 A1 | 6/2002 |
| WO | 2007/061616 A1 | 5/2007 |
| WO | 2008132354 A1 | 11/2008 |

OTHER PUBLICATIONS

Kyritsis et al., "1st World Conference on Biomass for Energy and Industry", Proceedings of the conference held in Sevilla, Spain, pp. 1547-1548, Jun. 5-9, 2000.

Chinese Office Action issued in connection with corresponding CN Application No. 200910253234.6 on May 26, 2014.

Song, X. et al. "Experimental Study on Co-Gasification of Biomass and Coal", Combustion Chemical Journal, vol.: 34, Issue: 3, pp. 303-308, Jun. 30, 2006.

\* cited by examiner

METHOD OF REDUCING OXYGEN REQUIREMENT OF A COAL GASIFIER

BACKGROUND

The invention relates generally to a gasification system, and more particularly to a multifuel, multizone gasification system.

Due to increasing crude prices, and relatively long term availability of coal, coal is being looked at as a one of the primary fuels of the future. Gasification of coal is an option that is environmentally more benign as compared to other methods of generating energy from coal, such as pulverized coal combustion. Coal gasification systems can be designed to remove CO2 before combustion of syngas produced as a result of gasification. Sequestration of CO2, however, is a technology currently being developed and has not yet been demonstrated on an industrial scale.

Gasification of biomass is another energy generation option. It uses renewable feedstock—biomass. Some examples of biomass include wood and other plant derived feedstocks. Plants consume carbon dioxide from environment during their growth. If biomass is utilized in gasification, the amount of CO2 released in the environment due to gasification, corresponds to the amount of CO2 consumed during growth of plants. Thus gasification or combustion of plant biomass does not add extra CO2 to the environment. Therefore, use of biomass is considered carbon neutral. The plant biomass can be grown relatively quickly as compared to other carbonaceous feedstocks. Utilization of biomass feedstocks helps reduce dependence on fossil fuel since they are renewable and can be grown relatively quickly. Thus, the use of biomass for power generation is attractive from the perspective of sustainability and environmental impact.

However, biomass contains a large amount of oxygen and moisture as compared to coal. The ash content can also be significantly higher; the exact quantity of ash depends on the source of biomass employed. Due to these aforementioned components, that do not have any heating value in themselves, the calorific value of biomass is much lower than that of coal. Due to lower heat content, gasification of biomass on scales comparable to coal combustion, such as toward production of 100s of MW of electricity, needs a large amount of biomass, of the order of hundred thousand tons per year. It becomes difficult to ensure a steady supply of such large quantities of biomass. Thus large systems based purely on biomass as a feedstock, tend to become practically unfeasible due to supply chain issues in procuring large quantities of feedstock. Hence, dedicated biomass conversion facilities such as biomass-fired boilers or gasifiers are typically limited in sizes up to 25 MW thermal equivalent.

Gasification systems using both coal and biomass have obvious advantages. Such systems have been proposed and developed earlier, but these have faced numerous operational issues. The simplest co-gasification systems use existing coal gasification systems and add biomass to coal. A few technology developers attempted to develop a system for biomass co-injection with coal, but such systems are typically limited to less than 5-10% of biomass by energy content. Such co-injection approaches cannot be readily extended to larger amounts of biomass for example due to layer formation in the feeding and storage systems resulting from different densities, sizes, and shapes of coal and biomass particles.

These systems face multiple problems, not only with the gasifier, but also with auxiliary systems such as the feed handling systems. For example, many types of biomass have a fibrous character that makes it difficult to grind as compared to relatively brittle coal. A common size reduction setup cannot handle a mixture of coal and biomass, or cannot produce satisfactory results.

It is desirable to have a gasification system capable of gasifying both coal and biomass, without having to face the aforesaid problems. It is also desirable to develop a method of operating gasifier that can gasify multiple fuels without operational problems. It is also desirable to have a method that can retrofit existing coal gasifiers to achieve fuel flexibility.

BRIEF DESCRIPTION OF THE INVENTION

Briefly, according to one embodiment of this invention, a method of operating a multi-fuel, multi-zone gasifier is provided. The method of operation includes steps of injecting a high-calorific-value feedstock and an oxidant into a first zone. Further steps of the method of operating the multi-fuel, multi-zone gasifier includes gasifying the high-calorific-value feedstock to substantially consume the oxidant within the first zone. The method further includes steps of injecting a low-calorific-value, high-oxygen-content feedstock into a second zone. Further steps of the method include gasifying the low-calorific-value, high-oxygen-content feedstock with oxidant from the low-calorific-value, high-oxidant-content feedstock.

Another embodiment of the present invention provides for a method of operating a multi-fuel, multi-zone gasifier. The method of operation includes steps of injecting a high-calorific-value feedstock and an oxidant into a first zone. The high-calorific-value feedstock is devolatilized in the first zone to produce volatiles and a char. The volatiles and a portion of the char are gasified in the first zone using the oxidant injected in the first zone. The reminder portion of the char continues to move downstream in the gasifier. The method further includes steps of injecting a low-calorific-value, high-oxygen-content feedstock into a second zone, located downstream of the first zone. The low-calorific-value, high-oxygen-content feedstock also devolatilizes in the second zone to produce volatiles, oxygen containing compounds and a second char. The oxygen containing compounds in the second zone gasifies the second char and the unreacted char produced in the first zone.

Yet another embodiment of the present invention provides for a method of controlling a multi-fuel, multi-zone gasifier. The method includes steps of injecting a high-calorific-value feedstock and an oxidant into a first zone and then gasifying the high-calorific-value feedstock to substantially consume the oxidant injected in the first zone within the first zone. The method further includes steps of injecting a low-calorific-value, high-oxygen-content feedstock into a second zone, the control operation includes controlling injection of the low-calorific-value, high oxygen-content feedstock in that second gasification zone when the oxidant injected in the first gasification zone is substantially consumed in the gasification reaction.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
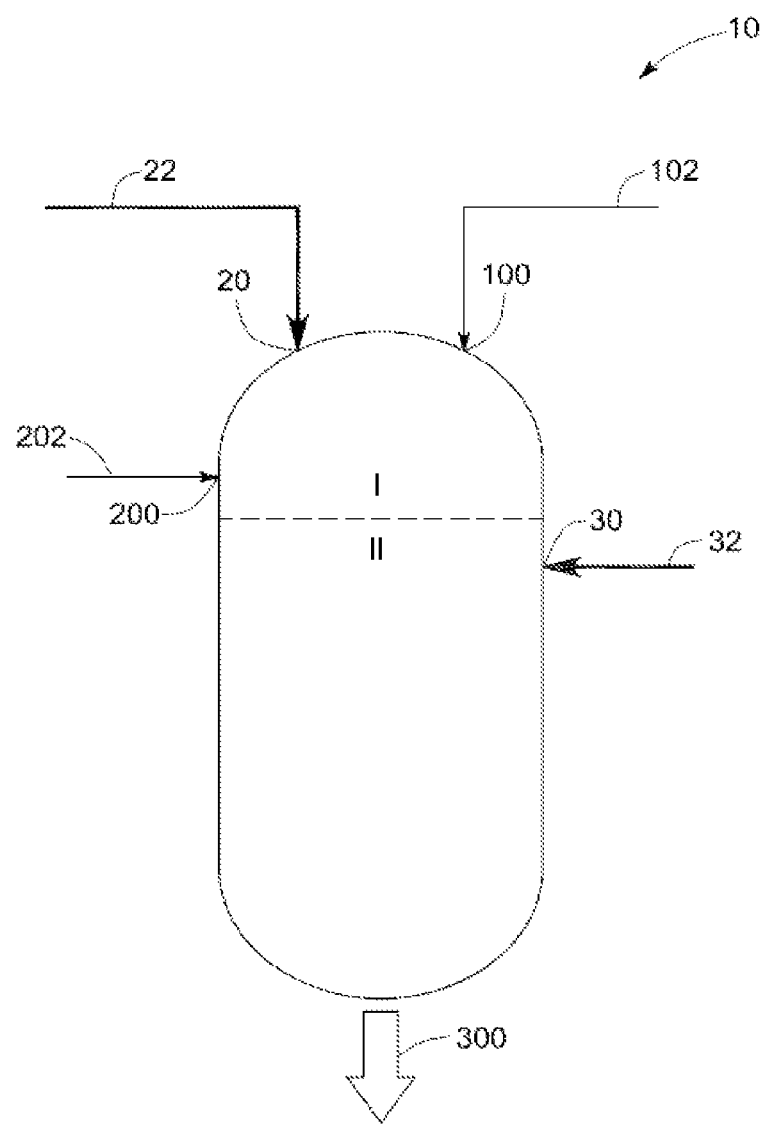
FIG. 1-FIG. 9 show schematic drawings of a multi-zone gasifier according to various embodiments of the present invention.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. In some instances, the term about can denote a value within a range of +/−10% of the quoted value.

Terms "heating value," "calorific value," "caloric value," are interchangeably used within this description.

As discussed in detail below, the embodiments of the present invention provide for a gasification system and a method to co-gasify at least two fuel feedstocks such as coal and biomass.

Coal is a common fossil fuel. There are many facilities using coal for gasification and for combustion in equipment such as boilers. There are various types of coals, most common classification is based on the calorific value and composition of the coal. ASTM (American Society for Testing and Materials) standard D388 classifies the coals by rank. This is based on properties such as fixed carbon content, volatile matter content, calorific value and agglomerating character. Broadly, the coals can be categorized as "high rank coal" and "low rank coal," which denote high-heating-value, lower ash content and lower heating value, higher ash content coals, respectively. Low-rank coals include lignite and sub-bituminous coals. These coals have lower energy content and higher moisture levels. High-rank coals, including bituminous and anthracite coals, contain more carbon than lower-rank coals and correspondingly have a much higher energy content. Some coals with intermediate properties may be termed as "medium rank coal."

The term biomass covers a broad range of materials that offer themselves as fuels or raw materials and are characterized by the fact that they are derived from recently living organisms (plants and animals). This definition clearly excludes traditional fossil fuels, since although they are also derived from plant (coal) or animal (oil and gas) life, it has taken millions of years to convert them to their current form. Thus the term biomass includes feedstocks derived from material such as wood, woodchips, sawdust, bark, seeds, straw, grass, and the like, from naturally occurring plants or purpose grown energy crops. It includes agricultural and forestry wastes. Agricultural residue and energy crops may further include husks such as rice husk, coffee husk etc., maize, corn stover, oilseeds, cellulosic fibers like coconut, jute, and the like. Agricultural residue also includes material obtained from agro-processing industries such as deoiled residue, gums from oil processing industry, bagasse from sugar processing industry, cotton gin trash and the like. It also includes other wastes from such industries such as coconut shell, almond shell, walnut shell, sunflower shell, and the like. In addition to these wastes from agro industries, biomass may also include wastes from animals and humans. In some embodiments, the biomass includes municipal waste or yard waste, sewage sludge and the like. In some other embodiments, the term biomass includes animal farming byproducts such as piggery waste or chicken litter. The term biomass may also include algae, microalgae, and the like.

Thus, biomass covers a wide range of material, characterized by the fact that they are derived from recently living plants and animals. All of these types of biomass contain carbon, hydrogen and oxygen, similar to many hydrocarbon fuels; thus the biomass can be used to generate energy. As discussed in a previous section, biomass includes components such as oxygen, moisture and ash and the proportion of these depends on the type and source of the biomass used. Due to presence of these components, the gasification characteristics of biomass are much different than that of coal. Due the presence of these components that do not add to heating value, the calorific vale of biomass is much lower than that of coal. The calorific value and composition of biomass also depend on other factors such as seasonal and geographical variability.

Although these differences in characteristics and variation in calorific value and other properties have traditionally created problems in biomass gasification, the embodiments as described herein use these variations, to take advantage of differences in reactivity and composition of the coal and biomass during co-gasification of coal and biomass.

Gasification involves a thermal processing of the feedstock with an oxidant stream to produce a synthesis gas. Synthesis gas or syngas is a mixture of gases, containing carbon monoxide (CO) and hydrogen (H2). The oxidant is an oxygen-supplying compound—this may be oxygen itself, air, steam, carbon dioxide, or some combination of these.

Gasification involves a number of reactions such as oxidation reactions,

C+½O2=CO

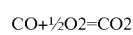
CO+½O2=CO2

H2+½O2=H2O the Boudouard reaction,

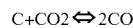
C+CO2⇔2CO the water gas or steam gasification reaction,

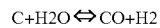
C+H2O⇔CO+H2 the water-gas shift reaction,

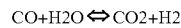
CO+H2O⇔CO2+H2 and methanation reaction

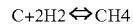
C+2H2⇔CH4

For high-rank coals that have low inherent oxygen content, gasification process can be represented as

$$CnHm + n/2 O2 \Leftrightarrow nCO + m/2 H2 \qquad \text{(Reaction 1)}$$

typically for high rank coals n=1 and 0.5<m<1. Steam injection is often used to control the gasification temperature of the high-rank fuels and to increase the hydrogen content of the product gas via water-gas shift reaction.

A typical biomass can be represented as CxHyOz, where x~1, y~2, and z~1. The gasification process of such biomass can be generically represented as

$$CH2O \Leftrightarrow CO + H2 \qquad \text{(Reaction 2)}$$

It can be seen that the oxygen content of the biomass can be advantageously used to minimize amount of the externally added oxidant (compare Reaction 1 and Reaction 2). However, in order for biomass gasification to proceed accordingly to Reaction 2, additional heat must be supplied.

The gasification is carried out in reaction vessels called gasifiers. The gasifiers, based on gas velocities and configuration, may be fixed bed, fluidized bed or entrained flow gasifiers or some variation of these. The types and extent of reactions in a gasifier depends upon design and operating conditions in the gasifier.

Entrained flow gasifiers are generally employed for large-scale gasification operations. Typically, these gasifiers use pure oxygen as a gasifying medium instead of air. Due to the use of oxygen instead of air as a gasifying medium, the calorific value of the product gas is much higher due to absence of nitrogen dilution. Additionally, use of pure oxygen results in high temperatures, enabling the ash to be produced as slag.

Traditional approaches of co-gasification typically use the injectors of coal gasifiers for injecting biomass as well. In many instances, the coal and biomass are injected at the same time through the same injectors into the gasifiers. Due to differences in the properties of coal and biomass and their different gasification characteristics, this arrangement faces operational issues and does not effectively gasify both coal and biomass. In contrast, the embodiments presented herein deploy two separate injection points for coal and biomass. Some of the gasifiers discussed in traditional approaches describe staged coal injection wherein coal is injected at multiple locations in the gasifier. In contrast, the embodiments of the present invention describe injection of at least two different fuels into the gasifier, designed and operated in a manner to effectively utilize the differences in the composition and characteristics of the fuels.

The embodiments presented herein envision operating multiple gasification zones within the gasifier, preferably one for each type of fuel (feedstock). FIG. 1 schematically shows an entrained downflow gasifier 10 with at least one injector 20 to inject coal 22, and at least one injector 100 for injecting an oxidant 102. The gasifier 10 may also be equipped with at least one injector 200 for steam 202. The product gas 300 is withdrawn from the bottom of the gasifier. The product syngas 300 can be used for power generation, chemical productions or combinations thereof.

The injectors 20 and 100 may be arranged at various angles and various locations. In the embodiment shown in FIG. 1, the injectors 20 and 100 are located at the top of the gasifier 10. In one embodiment, injectors 20 are configured to inject coal 22 in a slurry form. In one embodiment, coal 22 is mixed with water to form the slurry. In yet another embodiment, the injector 20 is configured to inject coal 22 as a dry feed. In some embodiments, the coal 22 is injected dry with a carrier gas (not shown). In some embodiments, the carrier gas is nitrogen. In another embodiment, the carrier gas is carbon dioxide. In yet other embodiments, the carrier gas such as natural gas, synthesis gas, and industrial off gas such as blast furnace gas is used. In some embodiments, steam may be injected into the gasifier as a moderator to reduce temperature around the injector due to thermal capacity of the steam. In addition, steam injection leads to lower gas temperatures throughout the gasifier volume due to endothermic water-gas shift reaction.

Advantageously, the oxidant 102 used in some embodiments is pure oxygen. In some embodiments, oxidant 102 may be oxygen-enriched air. In yet another embodiment, the oxidant 102 is air. In some other embodiments, the oxidant 102 may be oxygen-depleted air. In yet other embodiments, the oxidant might be a mixture of any of these compounds with carbon dioxide, steam, or both.

The coal 22 injected through injectors 20 is gasified by oxidant 102 and steam 202. The gasifier 10 is designed such that the oxidant 102 is substantially consumed in a limited region, designated as first zone, shown as "I" in FIG. 1. Under the high-temperature condition of the gasifier, the coal undergoes drying and devolatilization in zone-I, forming (coal) char. Coal char particles move downward, react with the gasification agent(s) such as oxidant and steam, and form syngas. Some of the coal char undergoes gasification in zone I and the remaining coal char moves downwards with the gas flow assisted by gravity.

Biomass 32 is injected through at least one injector 30 located just after first zone. This is shown as second zone "II" in FIG. 1. As described earlier, the biomass is characterized by the presence of oxygen and moisture. As the biomass 32 enters gasifier 10, it undergoes drying and devolatilization to release moisture and oxygen containing compounds. Devolatilization also releases volatile compounds leaving behind a (biomass) char. The moisture and oxygen containing compounds react with both the volatile matter released and the char-both coal char and biomass char, thereby producing synthesis gas. Thus, in some embodiments there is no need to add an oxidant or steam in the second zone.

A typical biomass 32 such as plant residue has a significant moisture content, typically about 10% to about 50% by weight, depending on the source, method of collection and processing methods, a substantial oxygen content ranging from about 35% to about 45 by weight on dry basis and high volatile matter content, usually from about 70% to about 80% by weight on dry basis. The chemical and physical properties of biomass make it highly reactive in gasifier environment. Moisture and volatile matter are expelled quickly and easily relative to coal, leaving a small amount of biomass char (compared to coal of same initial weight). Biomass char can be substantially more reactive than coal char due, in part, to large amount of macro- and meso-pores that enhance intra-particle gas transport, as well as to presence of inorganic matter such as alkali and alkali earth metals that promote char reactivity.

As discussed earlier, a portion of the unreacted coal char formed in zone I continues to flow down to zone II. The moisture and oxygen-containing volatiles derived from biomass act as additional gasification agents for coal char gasification, enhancing coal char conversion to produce syngas 300. The highly reactive biomass char can contribute to enhanced gasification of the coal char. While the residence time of biomass particles in the gasifier in this embodiment is shorter than the residence time of coal particles, the biomass is sill converted to products with high efficiency because of the low biomass fixed carbon content, high volatile content, and high biomass char reactivity. The embodiments of the present invention provides for a synergy between gasification of coal and biomass. Gasification of coal provides heat for gasification of biomass, and gasification of biomass provides for oxygen containing compounds for gasification of coal.

The term "zone" used herein refers to a region of the gasifier. The zones are not physically separated with a separation baffle unless specifically noted. Thus, a zone corresponds to a processing region within the gasifier. It is also conceivable that a zone such as zone II may further include sub-zones or regions that include, for example, typical unit processes and operations involved in gasification such as drying, devolatilization and carbon conversion reactions. These sub-zones may be overlapping with each other. The zones on the other hand may be fairly distinct. In some embodiments, there is a partial overlap of the successive zones.

The flow field characteristics of the gasifier itself can be advantageously utilized to further separate the devolatilization zones of coal (zone I) and biomass (zone II) and enhance the effect of biomass devolatilization products on coal char gasification. For example, in a gasifier as shown in FIG. 1, the highest temperatures and downward vertical velocities typically occur near the vertical axis of the reactor, whereas the temperatures near the wall are lower. Injection of biomass fuel into or near the relatively colder zone of the reactor will allow deeper penetration of biomass particles into the reactor before substantial devolatilization of biomass takes place. In addition, biomass injection characteristics (carrier characteristics and flow rate, injector location and geometry, number of injectors, injection method (dry vs. slurry), etc) can be adjusted such that the products of biomass devolatilization are transported by the recirculating flow to the coal char particles, enhancing coal char gasification.

The configuration described in FIG. 1 is not restricted to co-gasification of coal and biomass. Stream 22 may be coal or any other high-calorific-value (HCV) feedstock. "High-calorific-value" as referenced herein corresponds to heating value of coal higher than approximately 11,000 BTU/lb (on dry basis). Thus stream 22 may include high-rank coal, medium rank coal, (petroleum) oil, natural gas or other carbon-containing compounds with heating value higher than about 11,000 BTU/lb (dry). The design of the at least one injector 20 may change depending on the actual fuel deployed. Stream 32 may be any low-calorific-value (LCV) fuel characterized by higher oxygen content (HOC) than fuel 22. The low calorific value corresponds to a heating value of less than about 11,000 BTU/lb. The oxygen content is relative to oxygen content of fuel stream 22.

TABLE 1

Comparison of feedstocks

| Feedstock | Pittsburgh Coal | North Dakota lignite | Wood | Soy Hulls |
|---|---|---|---|---|
| Proximate Analysis | | | | |
| Moisture | 2.4 | 35.9 | 10.0 | 8.5 |
| Fixed Carbon (dry basis) | 54.5 | 41.5 | 16.7 | 13.6 |
| Volatile Matter (dry basis) | 37.5 | 43.9 | 81.5 | 82.1 |
| Ash (dry basis) | 8.0 | 14.6 | 1.8 | 4.2 |
| Total (dry basis) | 100 | 100 | 100 | 100 |
| Ultimate Analysis (dry basis) | | | | |
| C | 77.7 | 60.1 | 49.6 | 44.7 |
| H | 5.0 | 4.0 | 6.0 | 5.9 |
| O | 6.2 | 19.2 | 42.2 | 43.2 |
| N | 1.5 | 0.6 | 0.3 | 1.8 |
| S | 1.6 | 1.5 | 0.1 | 0.2 |
| Ash | 8.0 | 14.6 | 1.8 | 4.2 |
| Total | 100 | 100 | 100 | 100 |
| Lower Heating Value, BTU/lb (dry basis) | 12,800 | 9,400 | 8,000 | 7,700 |

Table 1 gives a comparison of properties of Pittsburgh coal (one of the high-rank-coals), North Dakota lignite (a low-rank coal), and two other feedstocks, wood and soy hull. As is seen from Table 1, the oxygen content in wood and soy hull is much higher than the oxygen content of coal. Thus Pittsburgh coal may be used as the high-calorific-value (HCV) feedstock 22 and wood, biomass or lignite may be used as the low-calorific value, higher oxygen content (LCV HOC) feedstock 32.

Thus, FIG. 1 generically shows an entrained flow gasifier 10, which is divided into two zones—first zone labeled "I" and second zone labeled "II." In the first zone, a HCV feedstock 22 is injected through at least one injector 20. The first zone is also equipped with at least one injector 100 for injecting oxidant 102. The first zone is also provided with at least one injector 200 for injecting steam 202. In one embodiment shown in FIG. 1, the at least one injector 20 for injecting HCV feedstock 22 is located at the top of the gasifier 10. Typically the entrained flow gasifier 10 is operated at pressures higher than atmospheric—typically about 20 bar to about 40 bar.

In one embodiment, the gasifier 10 is provided with one injector 20 located on the top of the gasifier, at its vertical axis. In another embodiment two injectors 20 are provided at the top of the gasifier, arranged symmetrically around the axis of gasifier. In some other embodiment, three injectors 20 are provided, one at the axis and other two arranged symmetrically around the axis of the gasifier. Thus, multiple injectors may be provided, depending on factors such as capacity of the gasifier, desired flowrate of the HCV feedstock 22 through injector 20, desired distribution of the fuel in the gasifier and the like. The injectors 20 may be arranged at angles suitable for a proper distribution of HCV feedstock 22 in the gasifier. In one embodiment, a single injector 20 is arranged perpendicular to the top of the gasifier. In another embodiment, the two injectors 20 are arranged perpendicular to the top of the gasifier. In yet another embodiment, the two injectors 20 are arranged at an acute angle to the top of the gasifier. In some embodiments multiple injectors 20 are provided, wherein some of the injectors 20 are arranged perpendicular, some at an acute angle and the remaining injectors 20 are arranged at an obtuse angle to the top of the gasifier 10. The fuel injectors 20 may also be disposed on the sides of gasifier 10 near the top region of the first zone.

The first zone is also provided with at least one injector 100 for oxidant 102. In some embodiments, a single injector may be configured to inject both the feedstock 22 and oxidant 102. The oxidant injector 100 may be arranged annular to the feed injector 20. In some embodiment, two oxidant injectors 100 may be arranged symmetrically around a central feed injector 20. In some embodiment, the oxidant injectors may be arranged in tiers to inject oxidant along the vertical axis of the gasifier in the first zone. The oxidant injectors 100 may be arranged at suitable angles to the top of the gasifier or to the axis of the gasifier 10, to ensure proper mixing of the feed 22 and oxidant 102. The rate of injection of oxidant 102 is governed by the rate of injection of feed 22, and is typically configured to be around the stoichiometric quantity required for complete gasification of the HCV feedstock 22. In some embodiments, the amount of oxidant 102 injected in zone I is below the stoichiometric amount of oxygen required to gasify the HCV feedstock 22 completely.

The first zone is also provided with at least one injector 200 for injecting steam 202. This steam 202 and oxidant 102 may be injected through a single concentric injector. Multiple injectors 200 may be arranged at various angles of injection, at various locations along the vertical axis of the gasifier in zone I, or top of the gasifier, to ensure a proper mixing of the HCV feedstock 22 and steam 202. The steam temperature and pressures depend on the operating temperatures and pressures of the gasifier.

As shown in FIG. 1, a LCV HOC feedstock 32 is injected through at least one injector 30 in the second zone, labeled as zone II. As previously described, after the exposure to high temperature, moisture and volatile compounds in the LCV HOC feedstock 32 are released. These also include oxygen-containing compounds such as CO, CO2, H2O, aldehydes, alcohols, ketones, esters, phenols, etc. These oxygen containing compounds and the moisture released react with the volatile compounds and remaining portion of fuel 32, leading to various gasification reactions shown earlier. Devolatilization of LCV HOC feedstock leaves behind a char (LCV HOC char) not shown.

Thus both zone I and zone II involve gasification reactions. The gasification reaction in first zone consumes a substantial portion of the oxidant injected in the first zone and gasifies a substantial portion of the HCV feedstock 22. The LCV HOC feedstock 32 is gasified in zone II. Thus both zones contribute to the generation of syngas 300. The two feedstocks are gasified separately without facing the issues mentioned earlier. The difference in the composition and properties of the LCV HOC feedstocks and HCV feedstocks is effectively utilized leading to complete gasification of both the feedstocks.

In one embodiment, the term "substantial consumption" as discussed herein refers to consumption of at least about 90% of the oxidant. In some embodiments, the term "substantial consumption" refers to a consumption of at least about 80% of the oxidant fed into the first zone. In yet another embodiment, the term "substantial consumption" refers to consumption of about 75% of the oxidant fed into the system. In some embodiments the term "substantial consumption" refers to a consumption of at least about 50% of the oxidant fed into the system.

Figure 2:
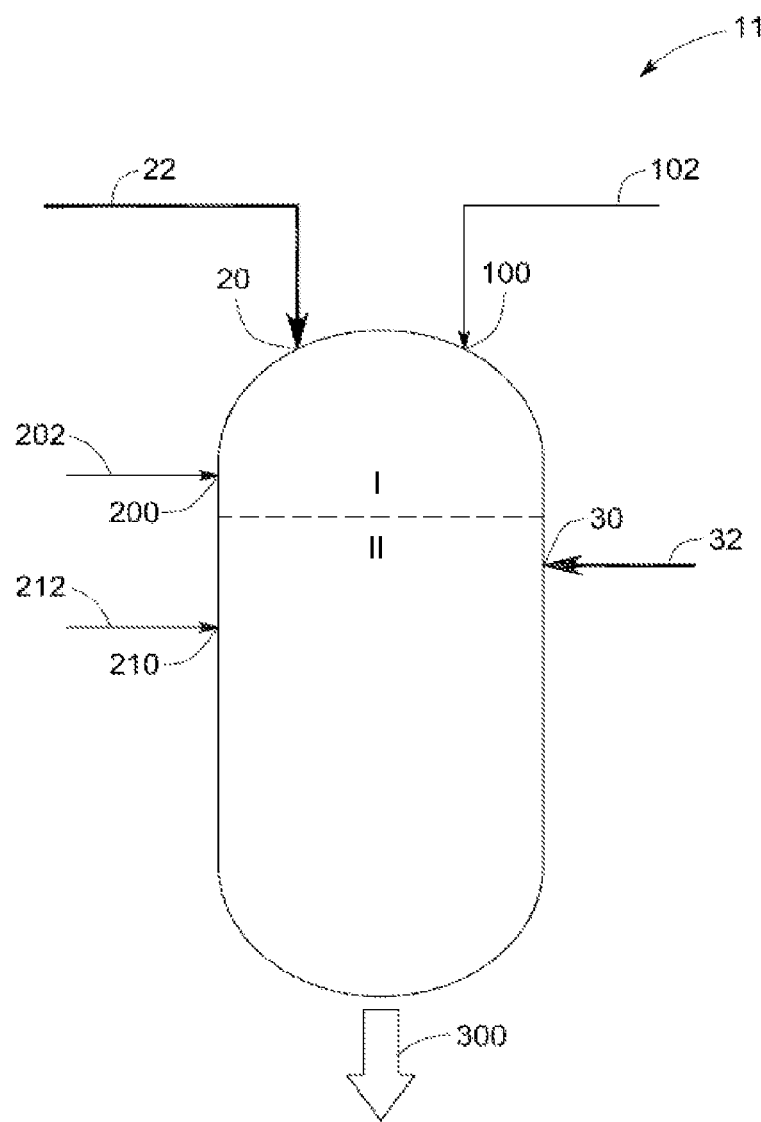

In some embodiments shown in FIG. 2, the second zone of gasifier 11 is equipped with at least one injector 210 for injecting steam 212. This is typically employed for LCV HOC feedstocks 32 such as rice husk that have low moisture levels, such as less than about 10 wt %. In the embodiment shown in FIG. 2, there is no separate injection of an oxidant stream. These embodiments are suitable for processing LCV HOC feedstock 32, which contains oxygen in sufficient quantities to gasify the feedstock 32, without any need for external oxidant supply.

Figure 3:
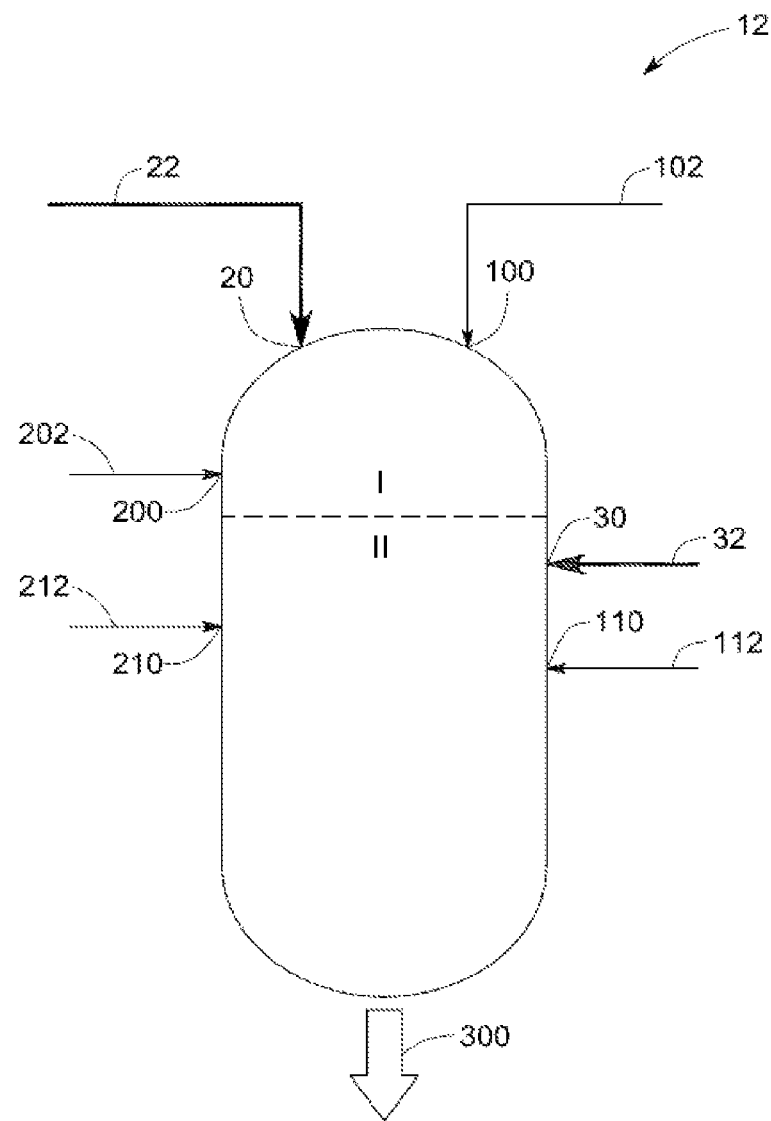

In other embodiment shown in FIG. 3, the second zone of gasifier 12 is provided with at least one injector 110 to inject oxidant 112 in addition to the steam injectors. Additional steam 212 and oxidant 112 may be required when the oxygen and moisture content in the LCV HOC feedstock 32 is not sufficient to sustain the gasification reactions. In some other embodiments, only one of the oxidant injectors 110 or 210 may be presented depending on the characteristics of the feedstock 32 such as moisture content and oxygen content.

In some embodiments, LCV HOC feedstock 32 includes low rank coal. In some embodiments, LCV HOC feedstock 32 includes waste coal. In yet another embodiment, the LCV HOC feedstock 32 includes biomass. In some embodiments, the biomass could be any of the biomass feedstocks described earlier. In some other embodiments, a partial blending of some of the biomass feedstocks described earlier may be employed. In some embodiments the partial blending of the biomass feedstocks is restricted to below 20% of total weight of the blend.

Figure 4:
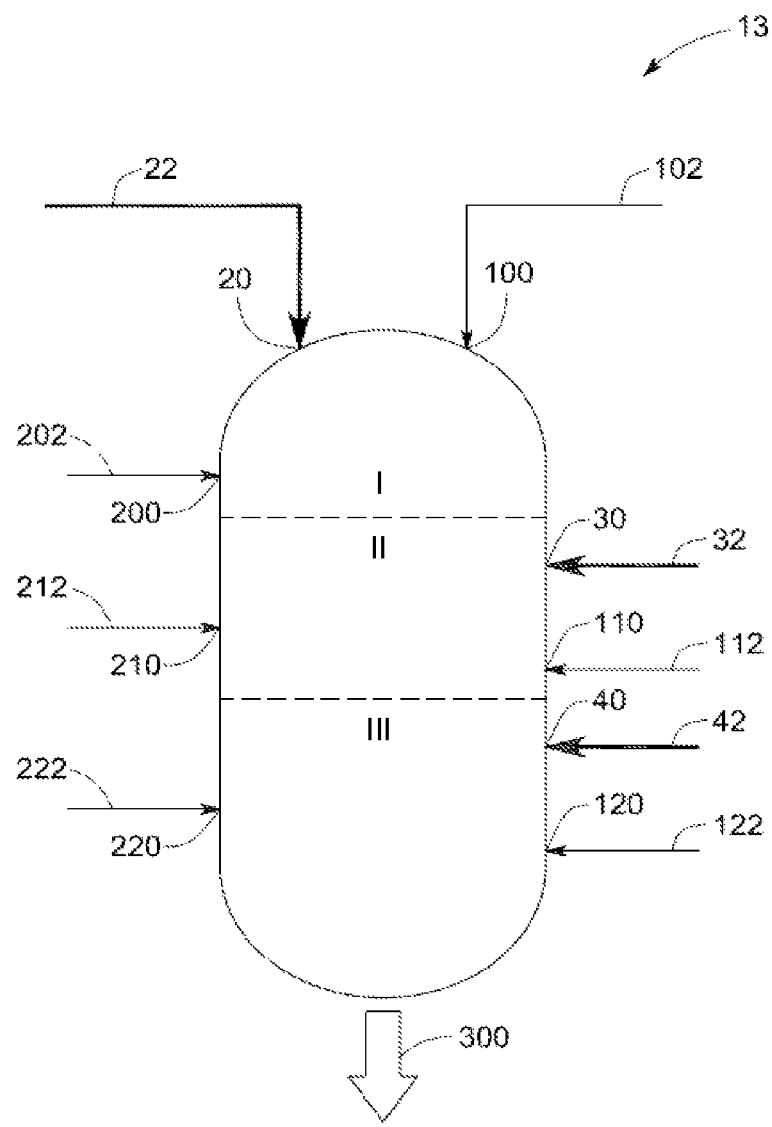

In another embodiment, as shown schematically in FIG. 4, the gasifier 13 is divided into three zones, I, II and III. First zone, labeled "I" is provided with at least one injector 20 for injecting a HCV feedstock 22. At least one injector 100 and at least one injector 200 are provided for injecting oxidant and steam respectively, similar to embodiments described in FIG. 1. The second zone, labeled "II" is provided with a LCV HOC feedstock 32. Similar to embodiments described above, fuel 32 has a calorific value less than that of the high calorific value feedstock 22. The oxygen content of LCV HOC feedstock 32 is higher than that of the HCV feedstock 22. Second zone may be provided with at least one injector 210 for injecting steam and at least one injector 110 for injecting oxidant into the second zone. The third zone, labeled "III" is supplied with another LCV HOC feedstock 42, which is a feedstock having a calorific value lower than HCV feedstock 22 and an oxygen content higher than oxygen content of HCV feedstock 22. If required, the third zone may also be provided with at least one injector 220 for injecting steam and at least one injector 120 for injecting oxidant 122 into gasifier 13.

In some embodiments, it is possible to extend the number of zones for multiple feedstocks and the gasifier may be configured to fire more than three feedstocks as shown in FIG. 4.

Figure 5:
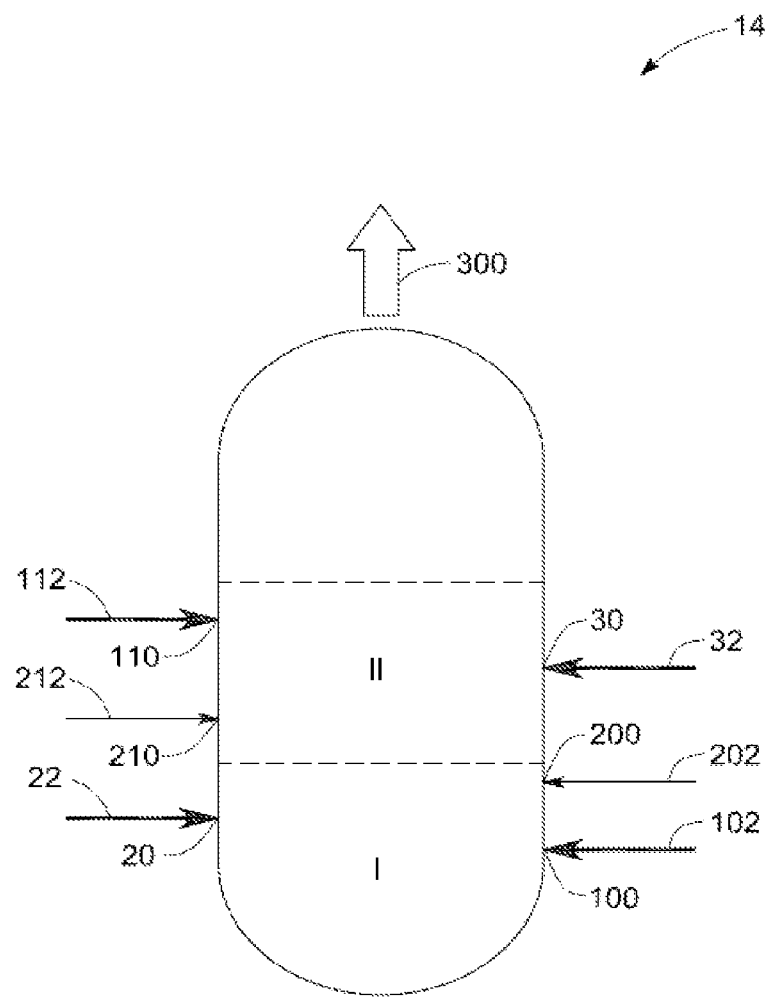

In the embodiments described above, the gasifier is a downflow gasifier, wherein the product gas (syngas) is withdrawn from the bottom of the gasification reactor. In some other embodiments, the gasifier may have an upflow configuration, where in the product gas is withdrawn from the top of the gasifier. One such configuration is illustrated in FIG. 5.

Accordingly, a gasifier 14 is provided with at least one injector 20 for injecting a HCV feedstock 22 from the sides of the gasifier 14; the at least one injector 20 is located towards a lower end of the gasifier 14. As described in the previous embodiments, the gasifier 14 is divided into multiple zones, the first zone labeled "I" is configured to received a HCV feedstock 22 and oxidant and steam. The oxidant 102 is injected through at least one injector 100 and the steam 202 is injected through at least one injector 200. Injectors 100 and 200 are located in the first zone. In some embodiments, the injectors 100 and 200 may physically be a part of the same injector. In some embodiments (not shown), a single injector is configured to inject a HCV feedstock 22, an oxidant 102 and steam 202. In some embodiments, several such injectors may be provided in the first zone of the gasifier 14. The quantity of the oxidant injected in the zone I is controlled such that the oxidant is substantially consumed within zone I.

Immediately downstream of zone I, the gasifier is provided with a zone "II" also called second zone, wherein a LCV HOC feedstock 32 is injected through at least one injector 30. In some embodiment, the gasifier 14 is configured to gasify the LCV HOC feedstock 32 using the oxygen content of the LCV HOC feedstock 32 itself. In some embodiments, depending on the oxygen content and moisture content of feedstock 32, oxidant 112 and steam may be injected into the gasifier through at least one oxidant injector 110 and at least one steam injector 210, respectively. The product gas 300 is removed from the top of the gasifier 14.

In some embodiments, the feedstock 32 is fed in the form of a water slurry through at least one injector 30. The water used for the slurry may be sufficient to provide steam for the gasification of LCV HOC feedstock 32. In such embodiments, the water used for making the slurry may be preheated using waste heat in the process, so as to reduce the energy penalty for evaporation of the water used for making a slurry-based feedstock 32. In some embodiments, the feedstock 32 may be mixed with a caloric liquid to form a slurry. A caloric liquid such as oil imparts fluidity to the feedstock 32 and also participates in the gasification reactions and contributes to production of syngas 300.

In some embodiments, more than one LCV HOC feedstock 32 may be used in the gasifier 14, for example, wood and rice-husk. These feedstocks 32 may be injected in the same zone or multiple zones, similar to previously described embodiment, shown in FIG. 4.

FIG. 5 shows a gasifier with the HCV feedstock 22 being fed from the sides of the gasifier 14. In some embodiments, the gasifier 14 may be provided with at least one injector 20 for injecting a HCV feedstock 22 from the bottom of the gasifier 14.

As discussed earlier, the zones in the gasifier may be physically separate, adjacent or partially overlapping regions of reaction. FIG. 6-FIG. 9 show several arrangements of injectors for the HCV and LCV HOC fuels and positions of zones.

Figure 6:
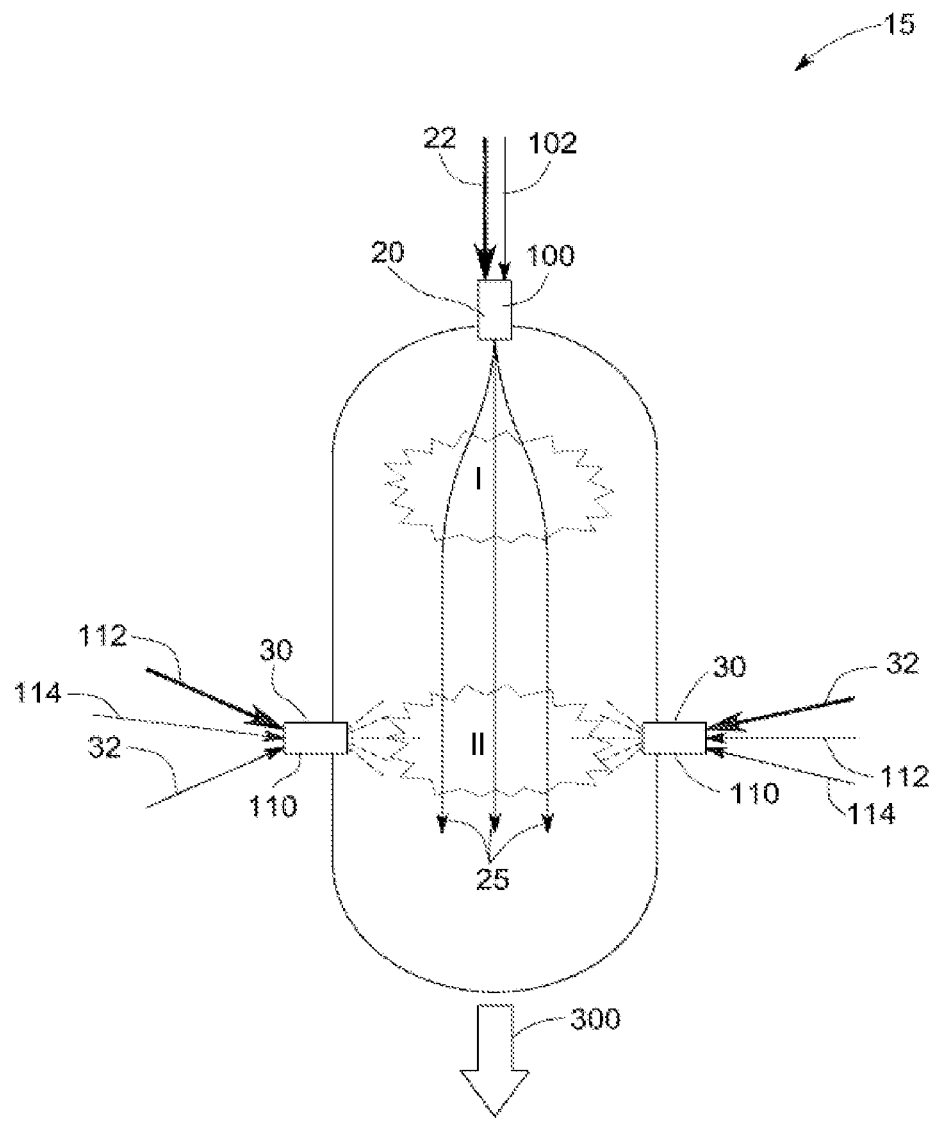

FIG. 6 depicts an embodiment, wherein the injector 20 for injecting HCV feedstock 22 and the injector 100 for injecting oxidant 102 are parts of the same physical structure. In some embodiments, the injectors 20 and 100 are arranged concentric to each other. In some embodiments, HCV feedstock injector 20 is positioned on the axis and the oxidant injector 100 is an annular conduit around the injector 20. In some embodiments, multiple injectors 110 may be provided that may be arranged in various orientations around the injector 20. In some embodiments an oxidant injector 100 is positioned at the axis and coal injector is disposed around the oxidant injector. In some embodiments the HCV injector 20 is sandwiched between two concentric oxidant injectors 100. The injectors 20 and 100 may have any of the cross-sectional shape—such as circular, elliptical, square, rectangular, polygonal etc.

Returning to FIG. 6, the flowrates of HCV feedstock 22 and oxidant 102 can be varied independently. The HCV feedstock 22 may be injected as a slurry or injected as a dry feed as discussed previously. The injectors are situated on the axis of the reactor on the top of the gasifier. The particle size of HCV feedstock 22, velocity of particles, angle of injection and velocity of the oxidant are controlled to achieve an appropriate distribution of HCV feedstock particles in zone I.

Figure 7:
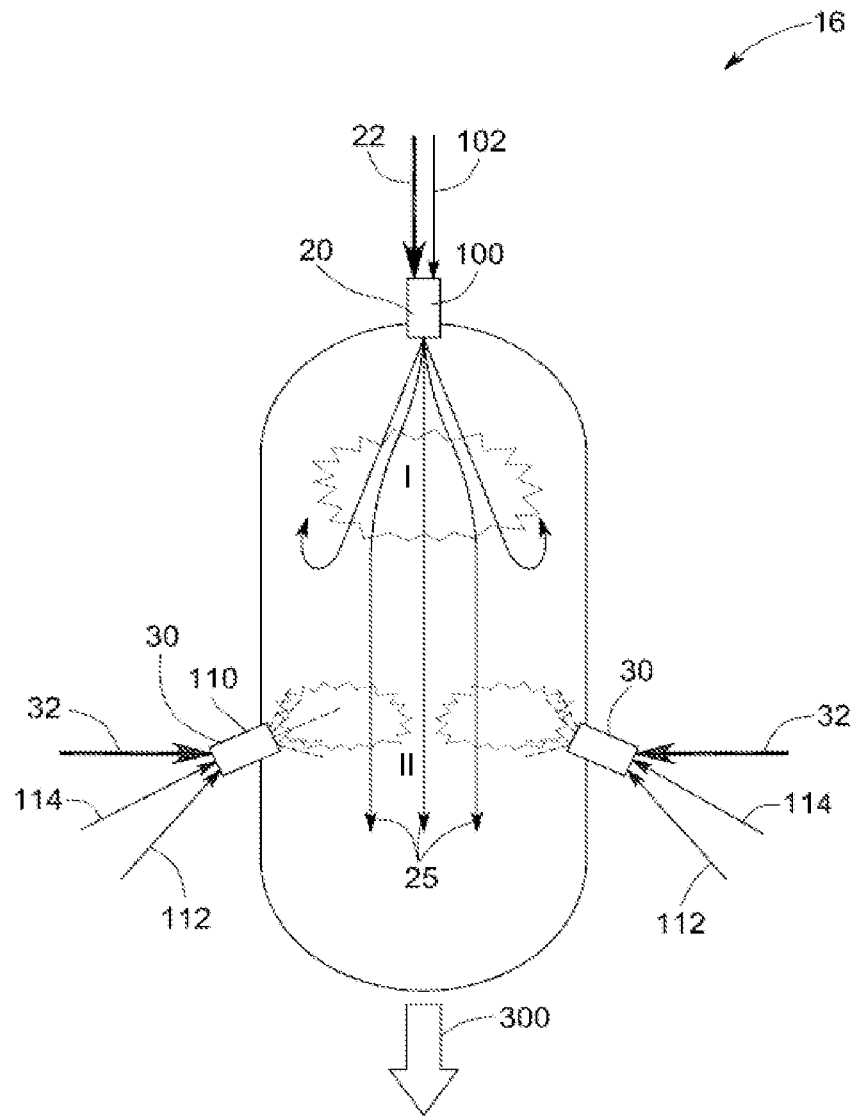

LCV HOC feedstock 32 is injected through at least one injector 30. FIG. 6 shows an embodiment with two injectors 30 located opposite to each other across the gasifier vessel. Any number of injectors 30 can be used. A carrier gas 114 used for injecting LCV HOC feedstock 32 can comprise nitrogen, carbon dioxide, steam, air, oxygen, oxygen-enriched air, oxygen-depleted air, process gas, syngas, or their mixtures. Additional oxidant 112 can also be injected in zone II. As shown in FIG. 6, the injector 30 for injecting LCV HOC feedstock 32 and injector 110 for injecting oxidant 112 are a part of the same injector. The feed injector 30 and oxidant injector 110 may be disposed in any of the configurations as described for feed injector 20 and oxidant injector 100 described above. The feedstock 32 is sprayed inside the gasifier vessel to form zone II. There may be a single zone II as shown in FIG. 6 or multiple zone II as shown in FIG. 7. The zones shown in FIG. 6 is only illustrative and does not show actual boundaries of zone I or zone II. The arrows 25 represent char 25 formed after devolatilization of HCV feedstock 22 in zone I. Char 25 gets further gasified with moisture and oxygen containing compounds released during devolatilization of LCV HOC feedstock 32. The reactive char formed after devolatilization of LCV HOC feedstock also contributes to enhancing gasification of char 25. The product syngas 300 is drawn from the bottom of the gasifier 15 as shown in FIG. 6.

FIG. 7 shows a similar configuration as FIG. 6. This embodiment is characterized by the presence of two (or more) zone II regions formed by spraying of LCV HOC feedstock 32. The HCV feedstock 22 is fed in a manner similar to that described in the embodiment of FIG. 6. The arrangement for injection of LCV HOC feedstock 32 is also similar, except the injectors 30 are disposed at an angle to the walls of gasifier 16. This arrangement facilitates recirculation of a portion of moisture (steam) and oxygen-containing volatiles as well as LCV HOC char formed from zone II back to zone I, illustrated in FIG. 7 where some arrows 25 are going back to zone I. Increased concentrations of steam and oxygen-containing volatile compounds in and near zone I improve gasification of coal char. Additionally, oxidation of the highly reactive LCV HOC char recirculated to zone I may lead to increased temperatures in or near zone I that will also result in improved gasification of coal char. Simultaneously, recirculation of at least a portion of LCV HOC char from zone II to the upper part of the gasifier increases the residence time of the LCV HOC char in the gasifier, thus improving its conversion. In addition to LCV HOC char, a portion of the syngas generated in zone II, or a portion of the oxidant or gasifying agent(s) may also circulate between zones I and II. By controlling the particle size of the LCV HOC feedstock 32, flowrates and pressures of the carrier gas 114 and/or oxidant stream 112 independently or in combination with each other the distribution of the LCV HOC feedstock and flow characteristics in zone II can be adjusted to achieve the optimum amount of recirculation between zones I and II. In another embodiment (not shown) similar to that illustrated in FIG. 7, the angle of injectors 30 relative to gasifier vessel axis can be adjusted in order to optimize the amount of recirculation between zones I and II.

Figure 8:
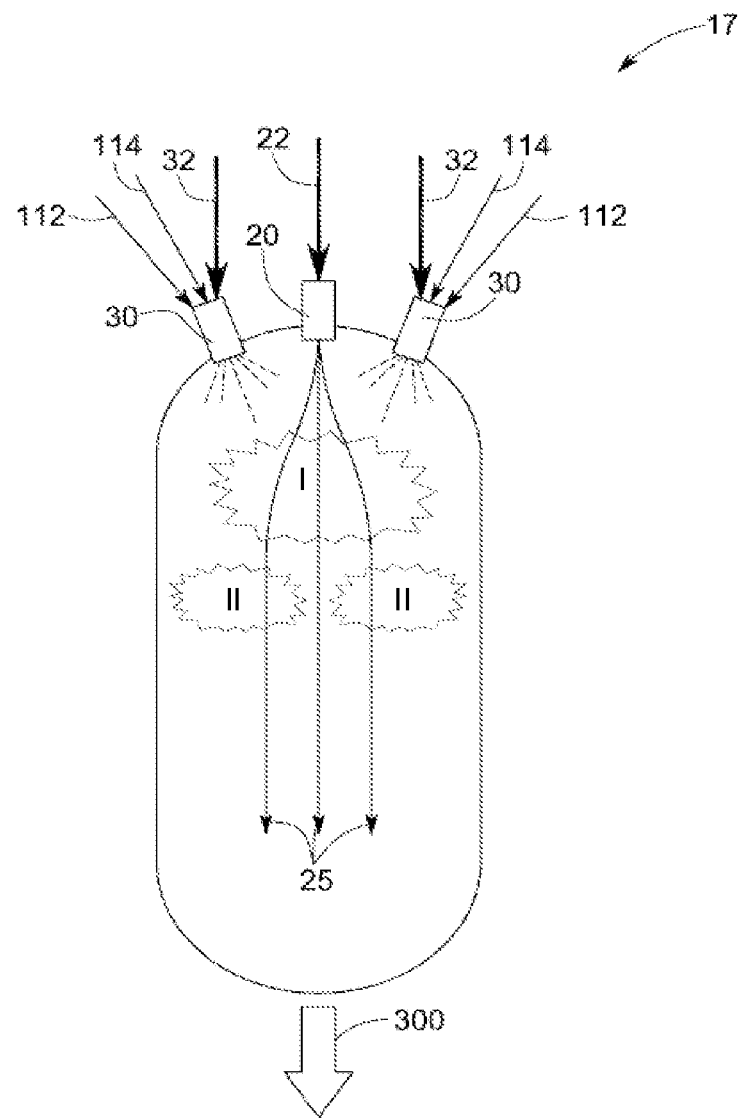

FIG. 8 shows another configuration including more than one zone II regions. The embodiment shown in FIG. 8 has injects for HCV as well as LCV HOC fuel disposed on the top of the reactor. By controlling the particle size of the LCV HOC feedstock 32, flowrate and pressures of carrier gas 114 and/or oxidant stream 112 independently or in combination with each other the LCV HOC feedstock is injected such that the particles of the feedstock 32 are sprayed beyond the particles of HCV feedstock 22 injected through injectors 20. Thus zone II is formed downstream of the zone I, formed due to spraying of HCV feedstock 22. By controlling the angle of injection of the feedstock and number and position of LCV HOC injectors, two zone II regions may be formed as shown in FIG. 8. In some embodiments, the angle of injection of the feedstock and number and position of LCV HOC injectors is controlled to form a single zone II region. In some embodiments, more than two zone II regions may be formed. By controlling the number of zone II regions, the conversion of char 25, recirculation of char, syngas and other components may be controlled. This in turn determines the conversion of the feedstocks 22 and 32 and the overall efficiency of the gasification.

Figure 9:
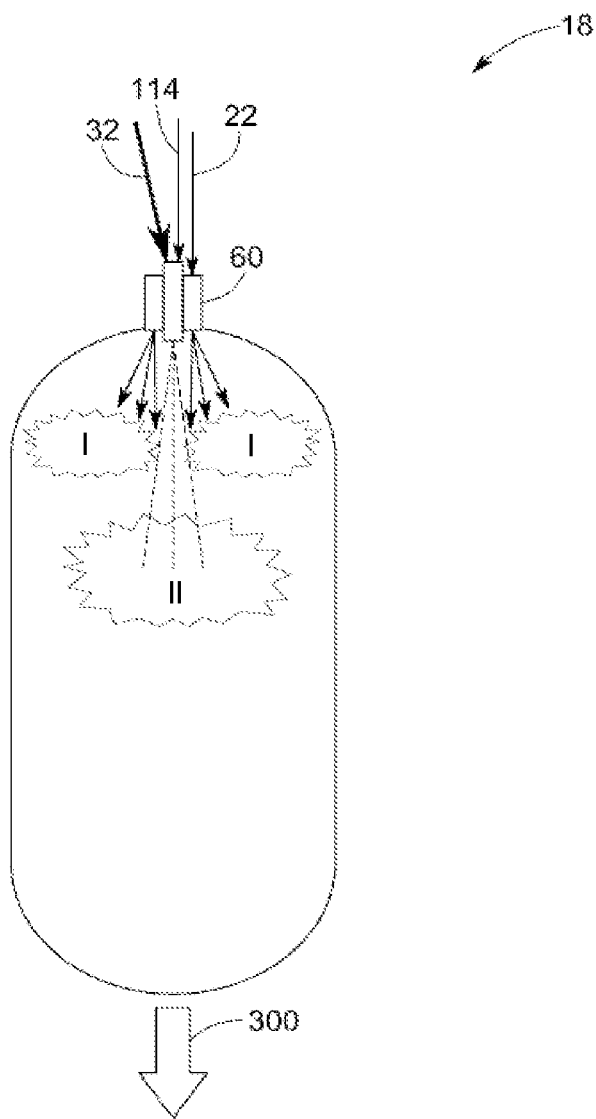

FIG. 9 shows another variant of embodiments in FIG. 8, wherein a single injector is configured to inject HCV feedstock 22 and LCV HOC feedstock 32 with requisite oxidant streams, without any mixing of the feedstocks in the injector. The composite injector is configured to inject the two fuel feedstocks 22 and 32 into two different zones. In the embodiment shown in FIG. 9, the central annular portion of injector 60 is configured to inject LCV HOC feedstock 32 with a carrier gas 114 in a relatively narrow jet to obtain deep penetration.

HCV feedstock 22 is fed through the concentric annulus around the injector for LCV HOC feedstock 32 using a carrier gas. The carrier gas for HCV feedstock 22 and carrier gas for LCV HOC feedstock 32 may be same or different. Controlling the particle size, velocity and pressure of injection of HCV feedstock 22 and the oxidant flow, controls the injection of HCV feedstock 22 such that the particles of HCV feedstock 22 are sprayed near the injector in a relatively wide jet pattern with moderate velocity in the proximity of the injector. The HCV feedstock 22 gets dispersed and devolatilizes in a region near the top of the gasifier that can be shown as zone I.

The injection velocity of feedstock 32, its particle size, and the velocity, pressure and flowrate of the carrier gas 114 is adjusted such that the particles of LCV HOC feedstock are sprayed away from the injector 60, at least partially downstream of the devolatilization zone of the HCV feedstock 22, into a region distant from the top of the gasifier shown as zone II.

By a proper choice of reactor geometry and particle size of the feedstocks, flowrates and pressures of carrier gases, gasification agents etc., the flow field inside the gasifier can be organized in such a way that the char particles created due to devolatilization of HCV feedstock interact with devolatilization products of LCV HOC feedstock, downstream of zone I (devolatilization zone of HCV feedstock), thereby enhancing gasification of HCV feedstock char.

Various injector arrangements are used to achieve desired distribution of at least two different fuels—HCV feedstock 22 and LCV HOC feedstock 32 within the gasifier. The injection characteristics of HCV feedstock 22 and LCV feedstock 32 (e.g., dry or slurry injection, particle size, injection velocity and pressure, amount and chemical composition of the carrier gas, etc.) are adjusted such as to achieve penetration of LCV HOC feedstock particles into the zone II while minimizing their conversion prior to reaching zone II. In one embodiment, finely pulverized HCV feedstock 22 is injected using an inert carrier gas. In some embodiments, the average particle size of feedstock 22 may range from about 50 microns to about 100 microns. In some embodiments, the average particle size of feedstock 22 ranges from about 5 microns to about 500 microns. In some embodiments, the feedstock 22 may have a particle size distribution between about 20 microns to about 900 microns. In some other embodiments, the feedstock 22 may have an average particle size below 1 mm. The carrier gas velocity and angle of injection of HCV feedstock 22 may be adjusted to effectively disperse the HCV feedstock particles in zone I without penetrating deep into the gasifier. Lowering the amount of carrier gas results in quicker heating of the HCV feedstock 22. Increasing the amount and/or velocity of carrier gas generally improves dispersion characteristics of the HCV feedstock. Using smaller particle size of the feedstock improves both particle heat-up and mixing, but increases the grinding costs and energy consumption during feed preparation.

The LCV HOC feedstock 32 is preferably ground to particle sizes larger than the particle size of the HCV feedstock 22. In some embodiments, the average particle size of LCV HOC feedstock is larger than about 300 microns. In some embodiments, the average particle size of LCV HOC feedstock is larger than about 1 mm. In some embodiments, the average particle size of LCV HOC feedstock may range between about 500 microns to about 2 mm. Grinding LCV HOC feedstock to particle sizes substantially larger than HCV feedstock particles minimizes the cost and energy consumption required for the processing of LCV HOC feedstock 32. The present invention effectively utilizes high reactivity of the LCV HOC feedstock to achieve its high conversion even using relatively large particle sizes. Additionally, the conversion of these larger particles of the LCV HOC feedstock in the present invention is improved by optimizing their injection characteristics, flow patterns, residence times, and operational control as described in the example embodiments.

Optimum penetration of the LCV HOC feedstock particles into the gasifier is achieved by optimizing their particle size and injection characteristics. Large particles of LCV HOC feedstock heat up slower after injection than the small particles of HCV feedstock 22, enabling deeper penetration of the LCV HOC feedstock into gasifier before a substantial conversion can take place. The larger and heavier particles of LCV HOC feedstock 32 are injected with a high velocity; the higher inertial force leads to a deep penetration into the gasifier. A higher flowrate of the carrier gas for LCV HOC feedstock and a narrower jet pattern leads to deeper penetrations. The larger amount of carrier gas also shields the LCV HOC feedstock particles from rapid heat-up, thereby delaying conversion until the particles penetrate deep into the gasifier. Such arrangements ensure the operation of gasifier 18 in the manner described above—devolatilization of LCV HOC feedstock 32 releases moisture and oxygen containing compounds in zone II, that act as additional gasification agents for the char generated from HCV feedstock 22.

As shown in FIG. 9, there may be more than one zone I region, and a single zone II region. In some other configurations, there may be more than one zone I regions and more than one zone II regions. The multiple zone II regions may be formed by injection of different LCV HOC feedstock or a tiered injection of these feedstock, varying injection characteristics of the fuel or a combination of such factors. Coming back to FIG. 9, a variety of configurations of feeding the feedstocks 22 and 32 with gasification agents can be arranged to form desired zone I and zone II regions. The zone I predominantly involves devolatilization and gasification of HCV feedstock 22 while zone II primarily involves devolatilization and gasification of LCV HOC feedstock 32 as well as enhanced gasification of the HCV char carried over from zone I. As shown in FIGS. 6-9, there could be more than one zone I region and more than one zone II regions in a gasifier. These zones I and II may be physically distinct, adjacent or partially overlapping. It is understood that the figures are only illustrations to show certain features and do not depict all the features of the gasifier. Thus, although FIGS. 6-9 do not explicitly show steam injectors 200, 210 etc., such separate steam injectors may be present in some embodiments.

Gasifier described in the embodiments gasifies different feedstocks such as a HCV feedstock 22 and at least one LCV HOC feedstock 32 in the same reactor vessel. Hence it is also termed as a co-gasifier and the process may be termed as co-gasification. This is in contrast with conventional coal gasifiers, wherein only coal is the feedstock that is gasified. This gasification of a single feedstock such as coal may be termed as monogasification to distinguish it from co-gasification. Some embodiments of present invention also provide for a method of operating a multi-zone co-gasifier.

Figure 10:
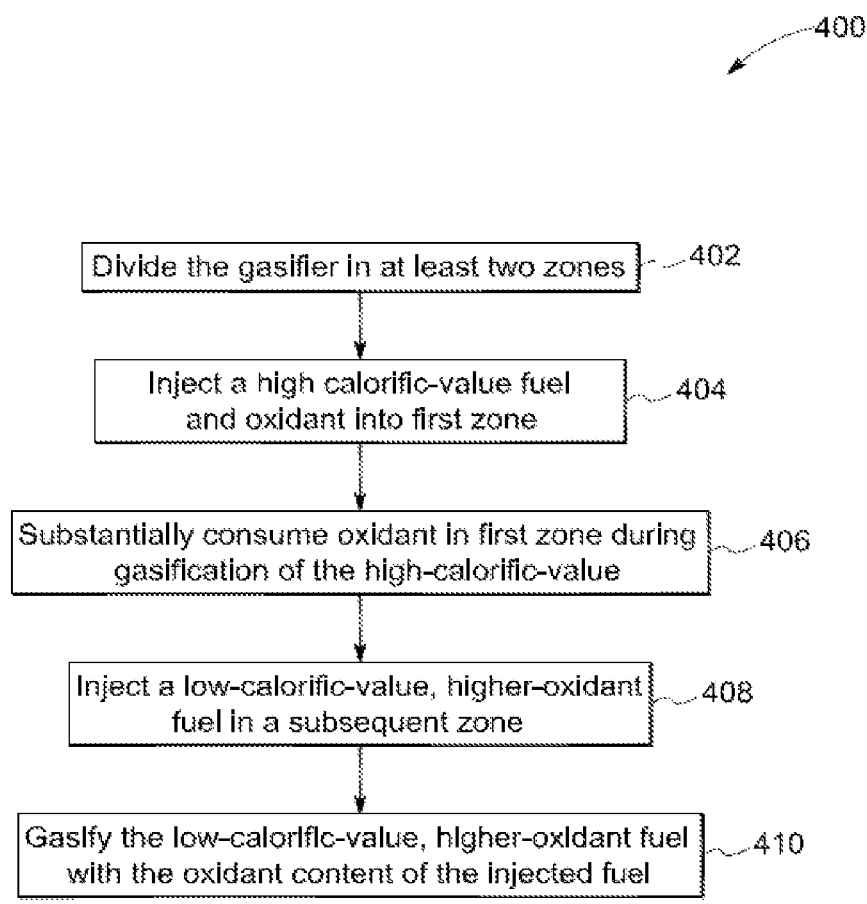
FIG. 10-11 show flow diagrams according to some embodiment of the present invention, for operating a co-gasification system.

According to one embodiment shown schematically in FIG. 10, a method 400 of operating a multi-fuel co-gasifier includes a step 402 of dividing the gasifier into at least two zones. Subsequently, as shown at 404, a HCV feedstock is injected in the first zone. Oxidant and steam are also injected in the first zone, for gasification of the HCV feedstock injected in the first zone. The process 400 is characterized by step 406 wherein the oxidant injected in the first zone is substantially consumed in the first zone itself.

Further, at step 408, a LCV HOC feedstock is injected in subsequent zones. If the gasifier is divided only into two zones, this corresponds to the second zone. If the gasifier is divided into more than three zones, the LCV HOC feedstock is injected into each of the zones subsequent to the first zone. In some embodiments, different LCV HOC feedstocks are injected into successive zones. In some embodiments, the different LCV HOC feedstocks injected into successive zones are characterized by successively higher oxidant content in the LCV HOC feedstocks. The LCV HOC feedstock is gasified in the subsequent zones, characterized in step 410, wherein the oxidant content of the LCV HOC feedstock is utilized in the gasification of the fuel.

Figure 11:
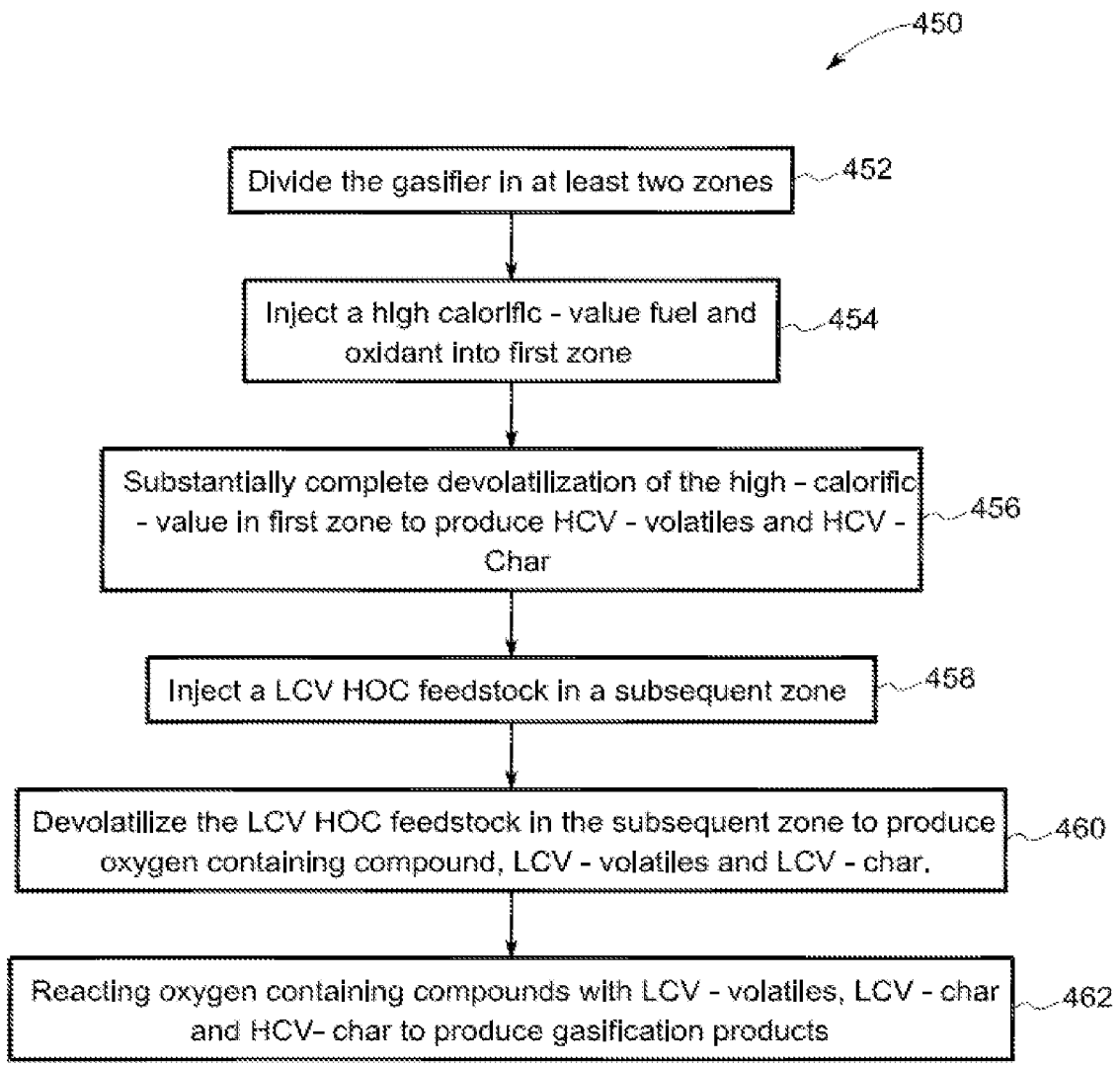

FIG. 11 highlights another aspect of method of operating a co-gasification system. The method is shown generically as 450. It includes a step 452 of dividing the gasifier in at least two zones to form a first zone (zone I) and a second zone (zone II). Zone II is located downstream of zone I. A HCV fuel feedstock is injected into the first zone, shown as step 454. The method of operation, 450 includes another step (not shown in FIG. 11), of injecting an oxidant into the first zone for gasification of the HCV feedstock. Optionally in some embodiments, additional steam may be introduced in zone I. The gasifier is operated in such a way that the devolatilization of the HCV feedstock is substantially complete in zone I. This is shown as step 456 in the method 450 of operation of the co-gasifier. The devolatilization produces volatile compounds (HCV-volatiles) and char (HCV char).

In one embodiment, the term "substantial devolatilization" as discussed herein refers to devolatilization of at least about 90% of the HCV feedstock. In some embodiments, the term "substantial devolatilization" refers to a consumption of at least about 70% of the HCV feedstock. In all embodiments, the term "substantial devolatilization" refers to a consumption of at least about 50% of the HCV feedstock in the zone I. The HCV volatiles react with the oxidant (and steam) injected into zone I to produce gasification products. The HCV char is gasified relatively slowly, and only a portion of the HCV char may be gasified in zone I. The remaining (unreacted) portion of the char continues to move downstream in the gasifier.

As shown at step 458, as LCV HOC fuel is injected in zone II of the gasifier. As shown as step 460, the LCV HOC fuel undergoes devolatilization in zone II to produce oxygen containing compounds, volatile compounds (LCV volatiles) and char (LCV char). As shown at 462, the oxygen containing compounds (which includes moisture, CO, CO2, aldehydes, ketones, phenols, esters etc.) react with LCV volatiles, LCV char and unreacted HCV char flowing in zone II from zone I to form gasification products. In one embodiment, the oxygen containing compounds released from LCV HOC feedstock are sufficient to gasify substantially all of LCV char, HCV char and the LCV volatiles.

In some embodiments, the oxygen content of the LCV HOC fuel (which give rise to the oxygen containing compounds after devolatilization in zone II) is sufficient for the gasification reactions. In some embodiments, additional amount of oxidant may be injected into the subsequent zones of the gasifier depending on the oxidant content of the LCV HOC feedstock. In some embodiments, the moisture (water) content of the LCV HOC feedstock (or the feed slurry if the feedstock 32 is mixed with water to forma a slurry before injecting into the gasifier) is sufficient to generate steam for the gasification reactions. In some embodiments, the zone II of the gasifier may be provided with additional steam supply requisite for gasification. The amount of steam injected in a zone depends upon the moisture content of the feed stream of the LCV HOC feedstock.

In some of the embodiments, the HCV feedstock injected in the first zone may be injected dry—either as such or with a carrier gas in case of solid fuels. In some embodiments, the carrier gas may be nitrogen; in some embodiments the carrier gas may be CO2. The CO2 may further take part in the reactions such as Bouduard reactions and contribute to the calorific value of the product gas generated. In some embodiments, the carrier gas may be a caloric gas, which participates in the gasification reactions and contributes to the calorific value of the product gas produced. On similar lines, the LCV HOC feedstock may be injected as such, or with a carrier gas, as described in the paragraph above. The fuel feedstocks, oxidant and steam may be injected through a single injector or through a multiple injectors into the gasifier. These injectors may be arranged in a variety of way in the gasifier.

In some embodiments the HCV feedstock is fed to the gasifier as a slurry. In some embodiments the slurry is made with water with or without added chemical agents. Other media that can be used to from slurry include—oils, pyrolysis products, and other hydrocarbon compounds. These carrier media may further participate in the gasification reactions to produce additional gasification product. In some embodiments the LCV HOC feedstock is mixed water to form a slurry before feeding to the gasifier. In some embodiments, both the HCV feedstock and LCV HOC feedstocks are mixed with water to from a slurry and then injected into the gasifier.

Thus the methods described in the embodiments above are integrally linked with the gasifier described previously. The design of the gasifier and the method of operation are such that the oxygen content of the LCV HOC feedstock gasifies both LCV HOC feedstock (32) and the char produced by HCV feedstock (22). The oxidant injected in the first zone is substantially consumed within the first zone. Special control means such as those described hereinafter may be employed to ensure such operation.

The gasifier is provided with a multiple sensing elements to measure various parameters of the feedstocks and the conditions in the gasifier. Where a composition is being measured, the measurements may be made continuously by using online measurement systems. Alternatively, the measurements may be made by sampling at regular intervals and performing an offline analysis of the samples. In some other embodiments, indirect measurements, also referred to as soft sensing approach may be used. In such measurements, a parameter is estimated based on the measured values of other parameters using a model or algorithm or a known relationship between the parameters. In one embodiment, the composition of the product syngas 300 may be used to deduce the oxidant content and distribution within the gasifier. A controller is configured to take the measured parameters as inputs and control the injection of at least one of a HCV feedstock, a LCV HOC feedstock, oxidant or steam into the gasifier.

In one embodiment, oxidant concentration in zone I is measured using any technique such as those discussed above. As discussed above, the method of operation includes a step to substantially consume the oxidant in the first zone. The measured value of oxygen concentration in zone I is a direct measure of this. In one embodiment the flowrate of HCV feedstock 22 and oxidant 102 is controlled to ensure a substantial consumption of the oxidant in the first zone. In some embodiments, the flowrate of HCV feedstock is adjusted. In some embodiments, the flowrate of oxidant itself may be adjusted. In some embodiments, where oxygen enriched or oxygen depleted air is used, the oxygen content of the oxidant stream may be controlled.

In some embodiments where the HCV feedstock 22 involves solid particles, optical sensors or other sensing mechanisms are employed to directly or indirectly sense the distribution of solids within each zone. Solids distribution gives a measure of the degree of mixing of the feedstock and gasifying media. If required, parameters such as angle of injection and/or location of injection of the HCV feedstock 22 are adjusted. Parameters such as angle of injection and location of oxidant and steam may also be adjusted. In one embodiment, the location of injection may be adjusted in embodiments with multiple feed injection ports 20, by varying the rate of feeding through each injector port 20. For example if a lesser than designed solid concentration is detected at the sides of the gasifier, the flowrate of the HCV feedstock 22 through central feeding port may be reduced and flowrate through peripheral injection ports may be increased, thus effectively controlling the location of feed injection. The angle of injection and flowrate (velocity of particles) together influence the mixing of the injected HCV feedstock 22 into the gasifier zone. If the plumes of solid fuels injected through separate injectors interfere with each other, the degree of interference may be adjusted to avoid pockets of improper mixing in the gasifier zone. Particle size of the feedstock 22 and the velocity of the particles injected through the feed port determine the depth of penetration of these particles into the gasifier before their drying and devolatilization proceed to a substantial extent. This is another factor that may be controlled in isolation or in combination to ensure a proper mixing of the HCV feedstock and the gasifying media. Similar arrangements may be made if a liquid HCV feedstock 22 is used.

The composition of gas in first zone (and each subsequent zone) may be sensed using suitable techniques. Depending on the gas quality as measured by percentage of CO for example, the extent or gasification and deviation from the design value can be ascertained. The extent of gasification is controlled by controlling particle size, residence time of the particle in the zone, oxidant and steam flowrates, temperature of gasifier etc. The angle of injection, location of injection of these gasifying media and their flowrates are adjusted to get the degree of gasification near to the design values.

Similar sensing mechanisms and control actions may be used for the LCV HOC feedstock injection and its subsequent gasification in the second and subsequent zone. There are additional sensing and control actions that are based on the LCV HOC feedstock.

For example, with reference to FIG. 3, the oxidant content of the LCV HOC feedstock 32 is sensed before injection into the second zone of the gasifier. The amount of oxidant 112 injected into the second zone is controlled based on the oxygen content of the feedstock 32. In some embodiments, the oxygen content of the LCV HOC feedstock 32 may be sufficient to gasify the fuel. In such embodiments, the flowrate of the oxidant into the second or subsequent zone is set to zero (embodiment shown in FIGS. 1 and 2). In other embodiments, the oxidant flowrate or oxygen content of the oxidant are adjusted to appropriate quantities to ensure proper gasification of the feedstock 32.

The moisture content of the LCV HOC feedstock 32 is also measured using appropriate methods. The moisture content of the feedstock 32 determines the amount (flowrate) of the steam injection required for proper gasification, such as stream 212-FIG. 3 into the gasification zone. A feed-forward type of controller may be employed to control the injection of steam into second and subsequent zones based on the moisture content of the LCV HOC feedstock injected into that zone. In some embodiments, such as shown in FIG. 4, more than one LCV HOC feedstocks 32 and 42 are available for firing into the gasifier. In these embodiments, the moisture content of each of the fuels —32, 42 etc. are determined individually and those measurements are used to control the quantity of steam injected —212 and 222, etc. in zones II and III respectively.

A peculiar characteristic of biomass, a LCV HOC feedstock 32 is that there is a seasonal and geographical variation in the composition of these fuels. For example wood has relatively lower moisture content in summer due to natural heating. The agro-residues such as rice husk collected from different parts of the world have different chemical composition depending on the soil characteristics of each region. Lookup tables or similar arrangements may be made to determine the properties of such feedstock corresponding to the season and geographical location of the source. These lookup tables may then be incorporated into the above-mentioned control of oxidant and steam injection into the gasifier.

In some embodiments, if the moisture content of the LCV HOC feedstock is very high, drying or other moisture removal techniques may be used to bring down the moisture levels to the design levels for fuel 32, before it is injected into the gasifier.

In some embodiments, sensing mechanisms measure characteristics of the product gas 300. This includes characteristics such as composition and flowrate of the product gas 300. Injection of either of the HCV feedstock 22 or LCV HOC feedstock 32, or both, oxidant injection in zone I or zone II or both, steam injection in zone I or zone II or both can be controlled to achieve desired quality and flowrate of the product gas 300. In some embodiments, the control actions in the first gasification zone also govern the amount of devolatilized char going to the second zone. Thus, the overall co-gasification is affected and may also be controlled by controlling the gasification of the high-calorific-value feedstock 22. Control of injection of the feedstocks 22 and 32 in turn refers to control of parameters such as flowrate, angle of injection, location of injection and particle size as discussed earlier.

Thus by controlling injection of LCV HOC feedstock 32 in second zone or fuels 42 etc. in subsequent zones (as shown in FIG. 4), the composition and flowrate of the product gas 300 may be altered. Depending on the availability of multiple feedstock, the composition of product gas 300 may also be altered by controlling the type of feedstock 32 introduced into the gasifier. For example, the composition and gasification characteristics of wood, and rice husk are different. The composition of product gas produced using both of these feedstocks can also be fairly different. Thus changing the LCV HOC feedstock 32 itself, or blending such feedstock with each other in calculated quantities will alter the composition of final product gas 300. Addition of oxidant streams 112 and steam 212 in zone II and similar streams in subsequent zones affect the extent of completion of gasification and thus have an effect on the quantity and composition of the fuel gas produced.

Controlling the parameters such as the location of injection, angle of injection, rate of injection, particle size of fuel of the HCV feedstock 22 into the first zone also alters the composition of the product gas 300. Depending upon the quantities of the feedstocks 22 and 32 employed, the contribution of the each feedstock towards generation of product gas can be controlled.

Thus the various control actions mentioned above are configured to operate the gasifier according to the method described above. In one embodiment, a supervisory controller is provided that governs these individual control actions. In some embodiments where a product gas composition and flowrate are being controlled, a supervisory control co-ordinates the control action on injection of multiple fuels, oxidant and steam injections in multiple zones, so as to attain the design values in the shortest response time. The supervisory control may employs any type of controller such as a feedback control, a feed-forward control, an artificial neural network control, a fuzzy logic control and a model based control.

Figure 12:
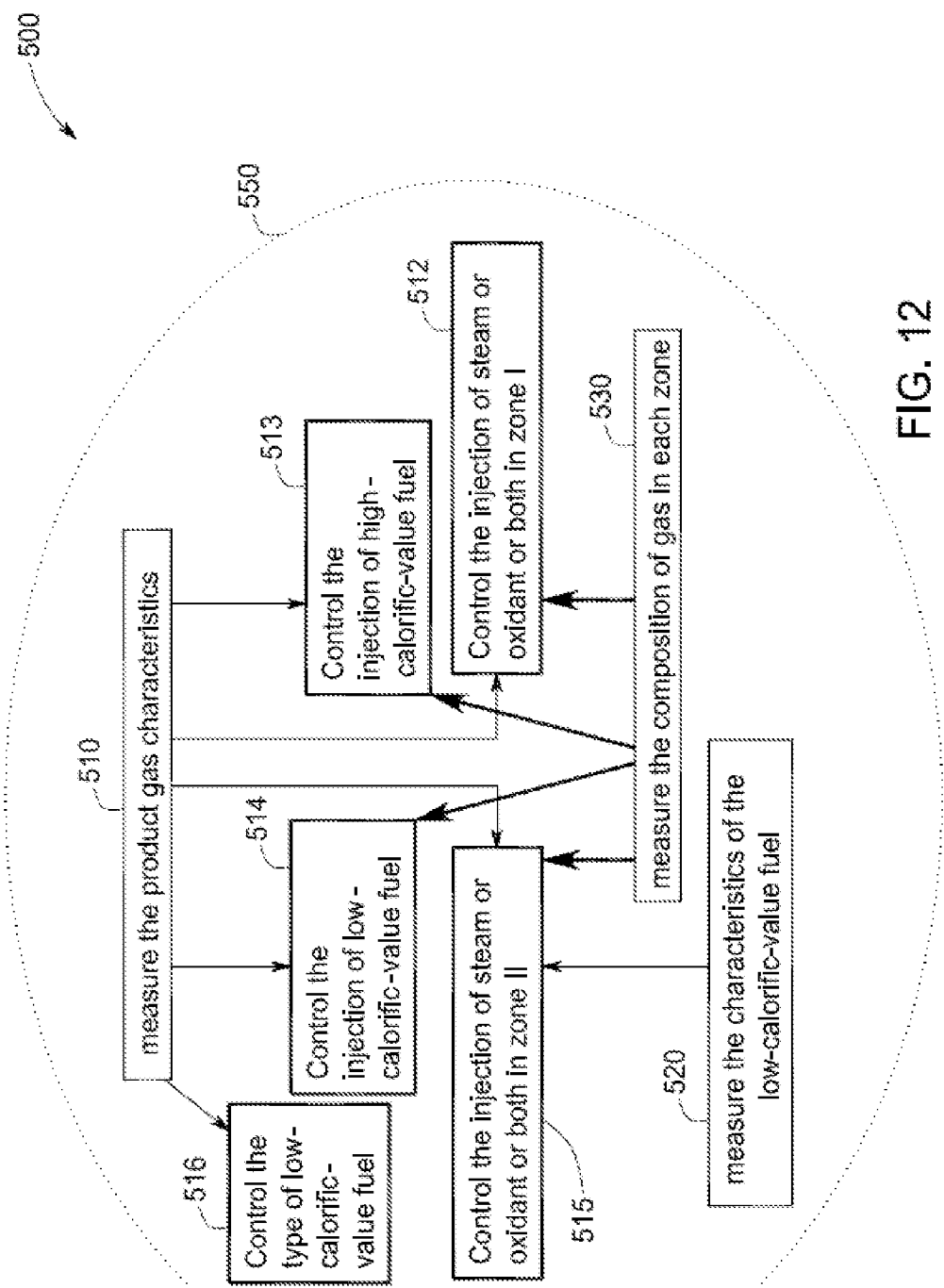
FIG. 12 shows a schematic of the control algorithm according to some embodiments for operating a co-gasification system.

The control actions and supervisory control in the gasifier operation are schematically shown in FIG. 12 as 500. It involves multiple sensing actions such as 510—'measure the product gas characteristics,' 520—'measure the characteristics of the low-calorific-value fuel' and 530—'measure the composition of gas in each zone.' Each sensing action in turn triggers different control actions as shown.

For example, sensing action 510—'measure the product gas characteristics' triggers at least one control action selected from 512—'Control the injection of steam or oxidant or both in zone I,' 513—'Control the injection of high-calorific-value fuel,' 514—'Control the injection of low-calorific-value fuel,' 515—'Control the injection of steam or oxidant or both in zone II,' or 516—'Control the type of low-calorific-value fuel.'

As discussed in preceding paragraphs, the controlling of injection of the HCV feedstock (22), shown as 513, includes controlling parameters of injection of the HCV feedstock (22). These parameters may include at least one of flowrate, location, angle of injection and particle size, injection velocity of HCV feedstock 22, flowrate of carrier gas and the like. Controlling injection of oxidant or steam or both in zone I as shown at 512, alters the rate and extent of the gasification reactions. Control actions 512 and 513 if carried out simultaneously, help in proper mixing of the HCV feedstock 22 with the gasifying media like oxidant and steam. Similarly, controlling injection of LCV HOC feedstock (32) (in second zone) shown as 514 includes controlling parameters of injection of the LCV HOC feedstock (32), such as flowrate, location, angle of injection and particle size. Controlling injection of oxidant or steam or both in zone II as shown at 515, alters the rate and extent of the gasification reactions of the LCV HOC feedstock. In some embodiments, depending upon the availability of the LCV HOC feedstock, an additional control leverage, 516 is available, wherein the type of the LCV HOC feedstock can be changed. As discussed earlier, changing the type of the fuel may alter the syngas production—both quantity and composition.

Sensing action 520—'measure the characteristics of the low-calorific-value fuel,' senses the characteristics such as the moisture content and oxidant content of the LCV HOC feedstock. Depending on the measured values, the injection of steam and oxidant in zone II is manipulated to achieve proper gasification of the LCV HOC feedstock.

Sensing action 530—'measure the composition of gas in each zone' is generic that may be carried out in any or all of the zones of the gasifier. Composition of gas gives information about oxygen content, CO content etc. that are indicators of the extent and efficiency of the gasification reactions. To adjust the extent and efficiency of the gasification, at least one control action selected from 512—'Control the injection of steam or oxidant or both in zone I,' 513—'Control the injection of high-calorific-value fuel,' 514—'Control the injection of low-calorific-value fuel,' 515—'Control the injection of steam or oxidant or both in zone II,' may be carried out. Another important aspect of sensing action 530 is to ensure a substantial consumption of the oxidant injected in zone I. The oxidant concentration in zone I is measured and a substantial consumption is controlled by control actions 512 and 513. In some embodiments, specially developed kinetic models of the co-gasification can be used in the soft-sensing technique for determining oxidant content in the gasifier. Detailed models can also help determine a spatial variation of oxygen and other species inside the gasifier.

The dotted circle 550 represents a supervisory control action. A supervisory control 550 involves multiple sensing and controlling actions as shown in FIG. 12. It may also involve other control actions such as those based on seasonal and geographical variability of LCV HOC feedstock, not shown in FIG. 12. The primary objective function for the supervisory control may be for example to maintain the flowrate and composition of the product gas (300) coming out of the gasifier within a certain predetermined range. The secondary objective functions may be to ensure complete gasification of each of the feedstock employed in the gasification. The further lower level objective functions then could relate to local composition, local solid loading, or like parameters. The supervisory controller manipulates various smaller level objective functions to achieve the primary objective function. In one embodiment, the supervisory controller 550 involves a model-based control, wherein a model used for design of the gasifier is built into the controller. Any deviation from the model/design values may trigger an appropriate corrective action. In other embodiment, the supervisory control may be based on artificial neural networks. The control actions involve feed-forward/predictive controls such as controlling the steam input to zone II, based on the moisture content of the LCV HOC feedstock (32). The control action also involves feedback control actions such as adjusting the flow of the HCV and LCV HOC feedstocks and the gasifying media such as the oxidant and steam, based on product gas quantity and quality.

In some embodiments, the supervisory control provides for an optimized operation of the multi-fuel co-gasifier. The optimization may be done with respect to any one or combination of parameters such as mass flow of HCV feedstock, mass flow of LCV HOC feedstock, total heat content of the fuels fired and the like. This allows the operation of the gasification system under any constraints on supply or availability of a particular type of fuel (feedstock). The optimized operation also gives the gasifier operator a flexibility to produce the required amount and quality of syngas using less costly feedstocks and saving on the higher cost feedstocks.

In some embodiments, the supervisory control may be configured to maintain a specific carbon to hydrogen ratio in the product gas 300. This is achieved by firing appropriate type of LCV HOC feedstock (32) such as exercising option 516 in FIG. 7. This option enables use of the gasifier in specialized applications of the product gas such as Fischer Tropsch synthesis, where higher chemicals are prepared starting from the syngas. These reactions need the carbon—hydrogen in a particular ratio for the chemical synthesis. Traditionally the desired ratio is obtained by subjecting the syngas obtained from the gasifier to water gas shift reaction. The embodiments of the present invention reduce the need for the water gas shift reaction.

Supervisory controller can control operations other than those shown in FIG. 12. In some embodiments, the supervisory controller can control the entire gasification system in contrast with just the gasifier. In some embodiments, the supervisory controller is configured to sense properties of the LCV HOC feedstock (32), such as bulk density and control the operation of the feed system accordingly. In some embodiments, the sensing system is configured to perform an ultimate and proximate analysis of the LCV HOC feedstock. Depending on the components such as moisture and mineral (ash) contents, requisite changes may be made in the feed handling system and the injection system. In some embodiments, the moisture and mineral contents of the LCV HOC-feedstock are used to control the temperature distribution in the gasifier, e.g. in zone II, where the LCV HOC feedstock is injected, and elsewhere, such as in zone I that can be affected by flow recirculation from zone II as described above, and downstream of zone II. The temperature of the gasifier is controlled such that the temperature of the slag formed due to the mineral content is maintained above the ash fusion temperature. The operating temperature in the gasifier is maintained to control the viscosity of the slag produced from the HCV feedstock and the LCV HOC feedstock within an operable range. A very high viscosity of the slag results into a thick layer of the slag over the refractory and possible blockage of the gasifier outlet. On the other hand, if the viscosity of the slag is very low, the slag has tendency to ingress into the refractory, leading to reliability and maintenance problems. The ability to maintain desired temperatures according to embodiments of the present invention helps to avoid these operability problems. In some embodiments, appropriate fluxing agents may be added to maintain slag characteristics in a suitable range. In some embodiments, the control system is configured to adjust the flowrates of the LCV HOC fuel injected to control the concentrations of inorganic components such as alkali and alkaline earth metals. The concentration of these components is controlled to improve the flowability characteristics of the slag formed in the gasification process.

In some embodiments, the slag characteristics such as viscosity, fusion temperature may be determined by suitable techniques such as a detailed model and this information may be used to control parameters such as rate of injection, angle of injection, location of injection, particle size and velocity of either the HCV feedstock or the LCV HOC feedstock or both. The rate, angle and location of oxidant/steam injection in any of the zone may also be controlled independently or together with the feedstock injection to control operating temperature and mineral content in the gasifier that ultimately affect the slag characteristics.

In some embodiments, the control schemes are configured to measure the nitrogen content of the HCV and/or LCV HOC feedstocks. The nitrogen content of the LCV HOC feedstock is adjusted by methods such as fuel blending. The amount of nitrogen compounds (HCN, NH3, etc.) contained in the product syngas depends on the nitrogen contents and forms of occurrence of nitrogen in the feedstocks, as well as operating parameters of the gasifier. The control scheme is configured to regulate the injection characteristics and other operational parameters of the gasifier to minimize the amount of nitrogen compounds (HCN, NH3, etc.) contained in the product syngas, alleviating syngas cleanup issues and reducing NOx pollutant formation during subsequent utilization of product syngas.

The control schemes described above may also be employed to retrofit an existing coal gasifier. A coal-gasifier may be retrofitted to utilize available LCV HOC feedstock such as low rank coal, wood, agro-residue, waste streams etc. A co-gasification of coal with biomass also reduces the carbon footprint of a gasification unit, since biomass is considered carbon neutral, as explained in previous section. Thus the more biomass is fired along with the coal, the lesser is the overall CO2 emission from the gasification unit and "greener" is the syngas generated. Ability to fire multiple feedstocks also makes a coal gasifier fuel-flexible and helps reducing dependence on single type of fuel or a single supplier. Thus modifying the gasifier according to the embodiments of this invention described below, and adopting the control scheme makes existing coal gasifier fuel flexible, making it possible to achieve the benefits discussed above.

A coal gasifier is typically equipped with a gasification reactor, injectors for coal, steam and oxidant and associated systems. The retrofitting involves dividing the gasifier into at least two zones, first zone for injecting coal, and second zone for injecting a LCV HOC feedstock, such as biomass. Depending on the availability of such a feedstock and its characteristics, the number of zones, location of zones is decided. Location and orientation of injectors for the LCV HOC feedstock is also decided based on the range of the properties such as moisture content, oxidant content etc. of the LCV HOC feedstock.

Figure 13:
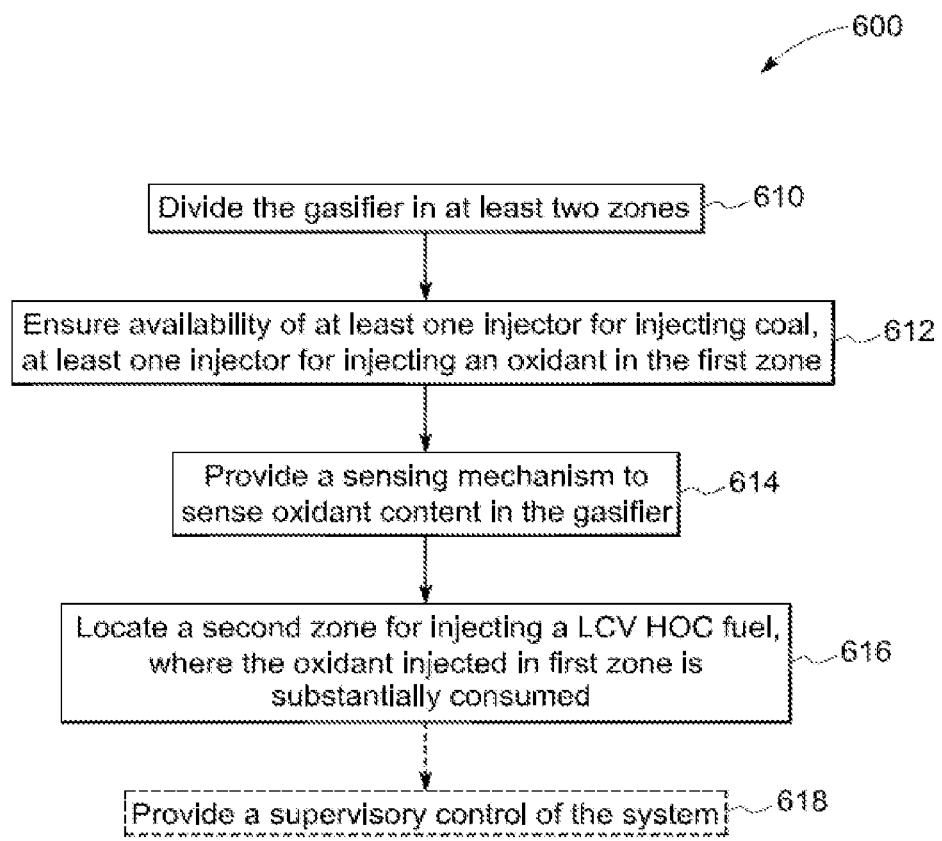
FIG. 13 shows a flow diagram of the an method according to some embodiments for retrofitting a coal gasifier.

The process of retrofitting is schematically shown in FIG. 13 as 600. Step 610 corresponds to doing design calculations and dividing the gasifier into at-least two zones. Zone I or the first zone gasifies the coal, similar to the original gasifier. Zone II, the second zone and subsequent zones gasify a LCV HOC feedstock.

Presence of at least one injector to inject each of the coal, oxidant and steam in the first zone is ensured. The location, layout of injectors, angle of injection, particle size of fuel handled etc. may need to be revised during the process of retrofitting. This is shown as 612 in the schematic of FIG. 13.

As shown at 614, the gasifier is provided with a mechanism to measure the concentration of oxygen in the gasifier. The measured values are used to control the operation of the gasifier such that a substantial amount of oxidant injected in zone I is consumed within zone I. A controller is provided to achieve this control as explained previously.

As per design calculations, a second zone of gasifier is located at the location where oxidant injected in the first zone is substantially consumed. At least one injector is provided in the second zone of the gasifier to inject a LCV HOC feedstock. This is shown as 616 in FIG. 13.

In one embodiment, the at least one injector for injecting coal in the first zone or the at least one injector for injecting the LCV HOC feedstock or both are configured to inject the fuel in a slurry form. In some embodiments, the slurry may be made using water. In some other embodiments the injection of coal or injection of the LCV HOC feedstock or both is done as dry feeding. In some embodiments, the feedstocks are injected dry using a carrier gas. In some embodiments, the carrier gas may be nitrogen, in some other embodiments, the carrier gas may be carbon dioxide, air, oxygen-enriched air, oxygen-depleted air, syngas, product gas, or mixtures of these and other gases.

In some embodiments, the retrofitted gasifier is configured to inject low rank coal as the LCV HOC feedstock. In some other embodiments, the retrofitted gasifier is configured to inject biomass as the LCV HOC feedstock. As discussed earlier, the term biomass is a wide term that can include feedstocks such as plant biomass and agricultural residues—wood, grass, husks, de-oiled residues, corn stovers and the like. In other embodiments, the biomass includes municipal and industrial wastes.

In some embodiments, as shown with dotted lines in FIG. 13 as 618, the retrofitted gasifier is provided with a supervisory control. The supervisory control is configured to control the operation of the gasifier as shown in FIG. 12 and as described in preceding paragraphs. It is configured to control the quantity and composition of the product gas coming out of the gasifier—now turned into a co-gasifier, by controlling parameters such as flowrate, location of injection, angle of injection and particle size of the feedstocks, flowrate and angle of injection of oxidant and steam in each zone or some combination of such parameters.

The retrofitting of the coal gasifier as discussed above enables it to use multiple types of fuels (feedstocks)—thereby imparting fuel flexibility to the gasifier and at the same time enabling it to use low-value feedstocks, paving way for economical operation.

The retrofitting can be performed on any of a downflow entrained flow coal gasifier, an upflow entrained flow gasifier, as well as other types of gasifiers.

Thus the embodiments of the present invention provide for a gasification system comprising a co-gasifier configured to gasify a HCV feedstock and a LCV HOC feedstock in the same reactor. The HCV feedstock may be selected from coal, oil or natural gas. The LCV HOC fuel may be selected from low rank coal, biomass, wastes such as MSW (municipal solid waste) and the like. The term biomass is a wide group of feedstocks as described earlier.

Retrofitting the coal gasifier according to embodiments of the present invention thus introduces LCV HOC feedstock in zone II, which is downstream of the coal devolatilization zone. At high temperatures existing in the gasifier, the oxygen containing compounds are released from LCV HOC feedstock. These oxygen containing compounds such as CO2, moisture, aldehydes, ketones, other organics, react with LCV HOC feedstock as well as with the coal char. Due to high operating temperatures oxygen containing products released from the LCV HOC feedstock form reactive species like radicals. Thus zone II wherein most of the LCV HOC gets devolatilized has a high concentration of the reactive species. When the char produced from coal in zone I reaches zone II, the gasification reaction of the coal char is accelerated due to the high concentration of the reactive species. The inorganic mineral (ash) content of the LCV HOC feedstock also helps catalyze the gasification reactions of the char. Thus the presence of radicals and catalyzing inorganic metal species of the LCV HOC feedstock result in improved carbon conversion of the coal fed into the gasifier. The oxygen-containing products of the LCV HOC feedstock devolatilization act as additional gasifying agents (oxidants) for the HCV feedstock. Therefore, the amount of oxidant injected with HCV feedstock can be reduced while still achieving desired carbon conversion levels. This reduces the oxygen requirement for coal gasification.

The reduced oxygen requirement in turn corresponds to smaller size of the air separation unit that produces pure oxygen supplied to the gasifier. Alternately, lesser amount of pure oxygen can be produced from the air separation unit, while still meeting the requirements of the gasifier unit. This results in substantial operational and capital cost saving of the overall gasification system (due to saving on the air separation unit). Traditional gasification systems use higher amount of pure oxygen in the gasifier to generate higher temperatures. The higher temperatures in turn result in higher conversion of char produced from HCV feedstock 22. The embodiments of the present invention accomplish higher conversion of HCV char by producing reactive species from devolatilization of LCV HOC feedstock. Thus the need for injecting higher amount of oxygen is eliminated.

Throughout this specification, terms such as "fuel," "feedstock," "feed" are interchangeably used. It is to be understood that they refer to the high-calorific-value fuel (HCV feedstock) or the low-calorific-value fuel (LCV HOC feedstock) as the context dictates (as indicated by the reference numeral 22 or 32 or the descriptor HCV or LCV). Sometimes the low-calorific-value, higher oxidant content fuel is also referred to as just a low-calorific-value feedstock. It is to be understood that a similar feedstock is being referred to in both the cases.

The embodiments of the present invention provide for firing of the high-calorific-value and low-calorific-value feedstocks separately in separate zones. Thus problems of common injection such as layering are avoided. Separate injectors and feed preparation arrangements are made for the two feedstocks that again eliminate the problems of a single injector feeding in both the feedstocks. Since the feed preparation sections are separate for each fuel, appropriate equipment, such as size reduction equipment may be employed depending upon characteristics such as brittleness, fibrous nature etc. of the feedstock.

The particle size of LCV HOC feedstock can be optimized to minimize fuel-processing requirements while achieving high conversion efficiency. The LCV HOC feedstock particle size might be chosen to provide desired mixing of low-calorific-value feedstock particles with the gases in the gasifier reactor during injection. For example, larger and heavier particles injected with high velocity penetrate deeper into the gasifier due to inertial forces, while smaller and lighter particles follow gas trajectories more closely. Thus by controlling the particle size of the feedstock fed to the gasifier, levels of mixing with the gasifier and the conversion efficiencies are controlled.

The moisture and oxygen content of the low-calorific-value feedstock, which otherwise lead to problems during gasifier operation, are effectively made use of by the present technique.

The embodiments of current invention provide for injection of HCV feedstock such as coal in the first zone. The LCV HOC feedstocks such as biomass are injected in successive zones. This arrangement leads to higher residence time of the high-calorific-value feedstock and lower residence time for the low-calorific-value feedstock. Since the volatile matter content in LCV HOC feedstock such as biomass is higher than HCV feedstocks such as coal, it can be relatively easily gasified. The char produced by such feedstocks is also comparatively more reactive due to presence of alkali metals and other minerals. Thus gasification of LCV HOC feedstock requires a shorter residence time in the gasifier as compared to the HCV feedstock. The feedstocks such as biomass are typically more reactive than coal; hence a lower residence time is required for gasifying such feedstocks. The embodiments of present invention provide for appropriate residence times by the arrangement of zones as described in the previous paragraphs. As discussed earlier, the feedstock such as biomass are more reactive due to higher volatile matter content and a lower fixed carbon content. Consequently, a larger particle size the biomass can be used for injection. In some embodiments, the particle size of the coal injected in the first zone is about 100 microns. The particle size used for the LCV HOC feedstock such as biomass, may be at least about 500 microns to about 1 mm.

In traditional approaches, since both of these feedstocks are injected together, it results into a lower gasifier temperature. The embodiments of present invention inject the two feedstocks separately. Thus the temperature in zone I is not lowered due to presence of the LCV HOC feedstock. Thus the embodiments of the present invention provide for gasification of HCV feedstocks at higher temperatures, as compared to the gasification temperatures of the LCV HOC feedstocks. Thus, optimum gasification conditions such as operating temperatures are provided for each feedstock, by implementation of the embodiments of the present invention.

Due to these advantages, the biomass loading of a retrofitted coal-gasifier can be increased up to about 40% by dry weight of the fuel. In some embodiments, the coal gasifiers are retrofitted such that about 30% of the energy value of the syngas is provided by the biomass or low rank coal. Depending on the availability of the feedstock, the retrofitted gasifier may be operated such that only about 10-15% of the energy value of the product gas is provided by the LCV HOC feedstock.

Injection into different zones effectively utilizes the differences in physical (such as particle size, density, moisture content, etc.) and/or chemical (such as oxygen content, volatiles content, fixed carbon content, ash content, mineral matter composition, nitrogen content, chemical structure and composition, etc.) properties of the different feedstocks. In addition, injection of different fuels in different zones within the gasifier makes effective use of different reactivities of these fuels towards various solid or gaseous compounds existing in the gasifier environment.

EXAMPLES

The following examples are presented to further illustrate certain embodiments of the present invention. These examples should not be read to limit the invention in any way.

Computational Fluid Dynamics (CFD) experiments, chemical equilibrium calculations and kinetic modeling of the gasifier were performed to illustrate some embodiments of the present invention.

A chemical equilibrium model of the co-gasification reactor is developed. Modeling of gasifier performance is conducted using Pittsburgh coal as a HCV feedstock and wood as a LCV HOC feedstock. Gasifier reactor is assumed to be adiabatic at a pressure of 30 atm. The chemical composition of the product stream was calculated assuming chemical equilibrium. The ultimate and proximate analyses of the fuels are shown in Table 1 presented in previous section. Table 2 lists the input streams to the gasifier, as well as calculated syngas product temperature, hydrogen and carbon monoxide mass flow rates, and H2/CO ratios. All input streams to the gasifier are supplied at ambient temperature Tamb=25° C. and pressure P=30 atm.

moisture input is calculated as the sum of moisture contents of HCV feedstock 22 and LCV HOC feedstock 32, and the water input as part of the slurry feed. Subsequently, input oxygen mass flow is chosen such as to maintain the same total elemental oxygen mass flow through the gasifier as in the base case. The total elemental oxygen mass flow is calculated as a sum of oxygen content of HCV feedstock 22 and LCV HOC feedstock 32 on dry basis, plus oxygen contained in the moisture (which in turn is a sum of moisture content of HCV and LCV feedstocks plus slurry water). As shown in Table 2, this approach results in substantial drop of calculated product stream temperature Tout.

Input water mass flows for cases 3 and 4 are chosen such as to maintain the same total elemental hydrogen mass flow input to the gasifier as in base case in addition to the same total carbon input. The total elemental hydrogen mass flow is calculated as a sum of hydrogen content of HCV feedstock 22 and LCV HOC feedstock 32 on dry basis, plus hydrogen contained in the moisture (which in turn is a sum of moisture content of the HCV and LCV feedstocks plus slurry water). The input oxygen mass flow rates are adjusted to maintain the same total elemental oxygen mass flow through the gasifier as in the base case. As can be seen from Table 2, both cases 3 and 4 allow the gasifier to operate in the proper temperature window while requiring substantially less oxygen input (94 and 88 percent by weight, respectively) than the base case. Additionally, both cases 3 and 4 lead to substantially lower water requirements than the base case. However, to achieve the water reduction in practice, the LCV HOC feedstock 32 is required to be injected as a dry feed in case 4.

TABLE 2

Data and Results of Equilibrium calculations

| Case | | Base | Case 1 | Case 2 | Case 3 | Case 4 | Case 5 | Case 6 | Case 7 |
|---|---|---|---|---|---|---|---|---|---|
| Coal | kg/s | 25.2 | 18.9 | 12.6 | 18.9 | 12.6 | 18.9 | 18.9 | 18.9 |
| Wood | kg/s | 0 | 10.7 | 21.4 | 10.7 | 21.4 | 10.7 | 10.7 | 10.7 |
| Water | kg/s | 16.4 | 15.5 | 14.6 | 13.1 | 9.7 | 11.6 | 15.5 | 15.5 |
| Oxygen | kg/s | 25.6 | 22 | 18.3 | 24.1 | 22.6 | 22 | 25.6 | 23.9 |
| Water (Vs. base case) | kg/kg | 1 | 0.94 | 0.89 | 0.8 | 0.59 | 0.71 | 0.94 | 0.94 |
| Oxygen (Vs. base case) | kg/kg | 1 | 0.86 | 0.71 | 0.94 | 0.88 | 0.86 | 1 | 0.93 |
| C | kg/s | 19.11 | 19.11 | 19.11 | 19.11 | 19.11 | 19.11 | 19.11 | 19.11 |
| O | kg/s | 42.3 | 42.3 | 42.3 | 42.3 | 42.3 | 38.85 | 45.92 | 44.29 |
| H | kg/s | 3.12 | 3.39 | 3.66 | 3.12 | 3.12 | 2.96 | 3.39 | 3.39 |
| $T_{out}$ | ° C. | 1445 | 1077 | 891 | 1388 | 1331 | 1197 | 1452 | 1282 |
| $H_2$ | kg/s | 1.64 | 2.03 | 1.95 | 1.67 | 1.7 | 1.87 | 1.59 | 1.79 |
| CO | kg/s | 35.5 | 33.3 | 27.2 | 35.2 | 34.9 | 36.1 | 33.7 | 33.8 |
| $H_2$ + CO | mol/s | 2,089 | 2,207 | 1,948 | 2,091 | 2,092 | 2,222 | 1,999 | 2,102 |
| $H_2$/CO | mol/mol | 0.65 | 0.85 | 1.01 | 0.66 | 0.68 | 0.73 | 0.66 | 0.74 |

Base case of Table 2 corresponds to fuel input comprises of 100% Pittsburgh coal injected as coal-water slurry into the gasifier. This corresponds to operation of a conventional gasifier (monogasification of coal). The various cases studied assume that the elemental carbon (as measured from ultimate analysis) input to the gasifier is constant at the same value of 19.1 kg/s—whether fed as a HCV feedstock 22 or LCV HOC feedstock 32 or a combination of the two. Cases 1, 3, 5, 6, and 7 assume that 75% of carbon input to the gasifier comes in the form of HCV feedstock 22 and the rest is fed to the gasifier in the form of LCV HOC feedstock 32. Cases 2 and 4 assume that 50% of carbon input is fed in the form of HCV feedstock and remaining is fed as the LCV feedstock. Keeping the carbon input constant simplifies the comparison of the results of various cases.

For cases 1 and 2, water input flow to the gasifier is kept same as the total moisture input to the base case. The total Case 5 is based on case 1, but the water flow is reduced in order to increase the gasifier temperature. By reducing water input from 15.5 to 11.6 kg/s, the gasifier temperature can be increased from 1077° C. to 1197° C., very close to the lower temperature limit of commercial entrained-flow gasifier operating window. H2+CO production in case 5 is higher (by ~6% on molar basis) than in the base case (monogasification of coal). Case 6 is based on case 1, but the oxygen input flow is raised in order to increase the gasifier temperature. By increasing oxygen input from 22.6 to 25.6 kg/s, the gasifier temperature can be increased from 1077° C. to 1452° C., slightly higher than the base case temperature of 1445° C. Essentially, case 6 makes use of the same amount of oxygen (25.6 kg/s) and slightly lower water input (15.5 kg/s vs. 16.4 kg/s) compared with the base case, while replacing 25% of HCV feedstock 22 by carbon content with LCV HOC feedstock 32. H2+CO production in case 6 is slightly lower (by ~4% on molar basis) than in the base case. Case 7 is based on case 1. The input oxygen flow rate is chosen to be intermediate between cases 1 and 6, resulting in gasifier temperature of 1282° C. It can be seen from Table 2 that case 7 allows approximately 7% reduction in oxygen and 6% reduction in water requirements while replacing 25% of HCV feedstock 22 on carbon input basis with renewable LCV HOC feedstock 32.

Based on the fuel analysis listed in Table 1, all modeling cases 1 through 7 in Table 2 would lead to substantial reduction in sulfur and ash content of the product stream, alleviating syngas cleanup requirements. Additionally, all modeling cases 1 through 7 achieve higher H2/CO molar ratio in the product syngas, which might be beneficial for downstream energy or liquid fuel production. Results of chemical equilibrium-based modeling presented in this example confirm the feasibility of stable operation of the entrained flow gasifier at higher loading of LCV HOC feedstock 32 such as biomass. The feasibility calculation show that up to 25-50% by carbon input can be inputted in the form of LCV HOC feedstock 32.

The co-gasification of HCV feedstock 22 (coal) and LCV HOC feedstock 32 (biomass) allows reducing oxygen and water requirements compared to coal-only base case (mono-gasification of coal), resulting in lower capital and operating costs of the gasification system. The optimum set of operating parameters depends on the thermal and other process requirements. Since LCV HOC feedstock 32 (biomass) and intermediate species formed during its gasification are more reactive than corresponding coal HCV feedstock 22 intermediates, additional benefits of co-gasification are assessed taking into account process kinetics.

Modeling of Integrated Gasification Combined Cycle (IGCC) plant performance is conducted using the co-gasifier described by the embodiments above. Various ratios of HCV feedstock and LCV HOC feedstock are employed. Chemical composition of product stream is calculated assuming chemical equilibrium. Coal is employed as the HCV feedstock 22 and biomass is used as the LCV HOC feedstock 32. The Ultimate and proximate analyses of the fuel feedstocks are shown in Table 3.

TABLE 3

Analysis of fuels used in IGCC modeling Example

| | Coal | Biomass |
|---|---|---|
| Proximate Analysis | | |
| Moisture | 11.83 | 30.0 |
| Fixed Carbon (dry basis) | 48.92 | 16.7 |
| Volatile Matter (dry basis) | 40.95 | 81.5 |
| Ash (dry basis) | 10.13 | 1.8 |
| Total (dry basis) | 100.0 | 100.0 |
| Ultimate Analysis (dry basis) | | |
| C | 69.5 | 49.6 |
| H | 5.1 | 6.0 |
| O | 10.2 | 42.2 |
| N | 1.5 | 0.3 |
| S | 4.4 | 0.1 |
| Ash | 9.3 | 1.8 |
| Total | 100.0 | 100.0 |

In this example, both coal and biomass are injected into the gasifier by dry feeding. To maintain the gasifier reactor at a constant temperature of 1427° C. (2600° F.), moderating steam flow with varying mass flow rate was used. Using steam to moderate the reactor temperature leads to lower thermal efficiency in the gasifier since the thermal energy produced by gasification reactions is absorbed by steam. When a part of coal fuel is replaced by moist biomass, the gasifier temperature can be effectively moderated by the energy required for biomass moisture vaporization. Additionally, heat content of biomass fuel is lower than coal due to typically high oxygen content of biomass, leading to reduced requirement for moderating steam and increased plant efficiency.

Calculations are performed assuming constant temperature and pressure of the gasifier reactor of 1427° C. and 43.5 atm, respectively. The total mass flow of carbon to the gasifier, equal to the sum of carbon coming from coal and carbon coming from biomass, was kept constant at 37.9 kg/s.

Figure 14:
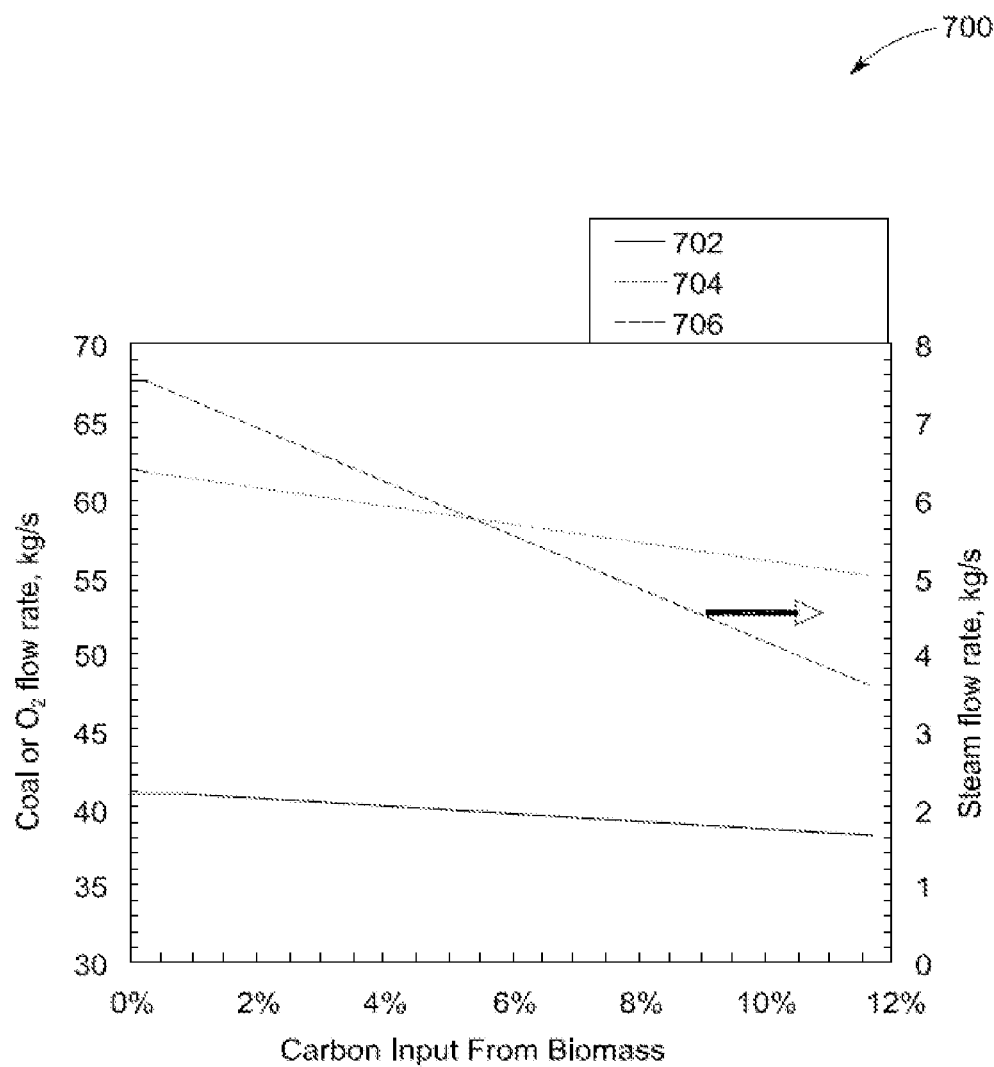
FIG. 14-16 shows results of equilibrium modeling of gasifier according to embodiments of the present invention.
Figure 15:
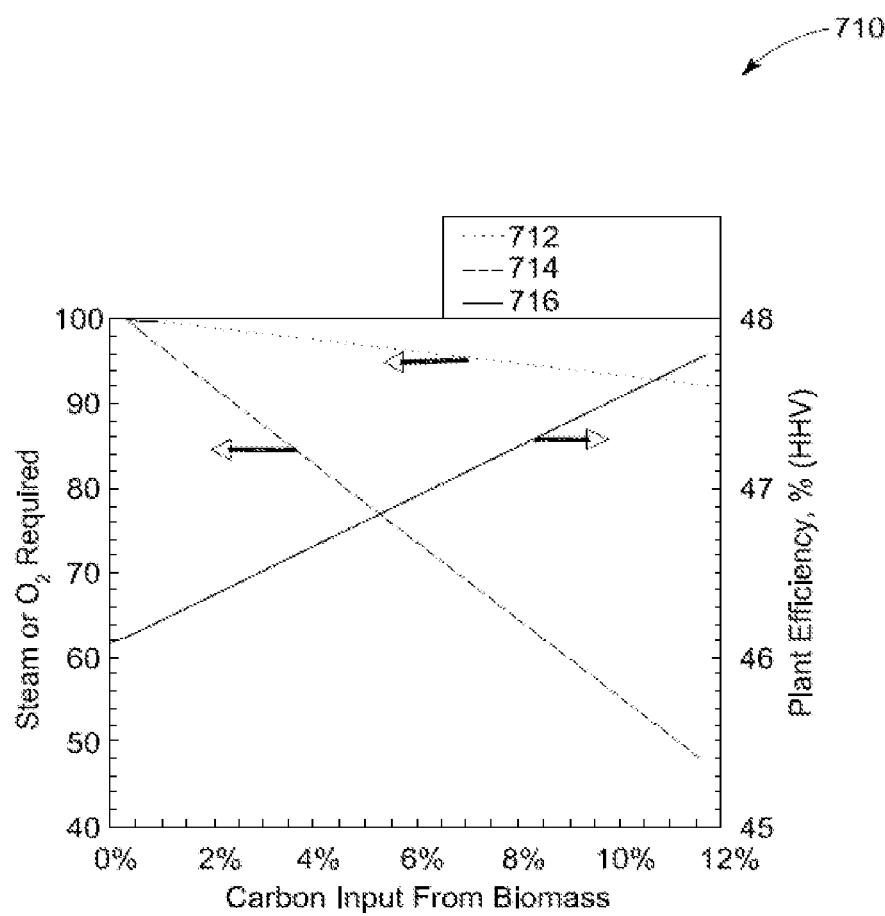
Figure 16:
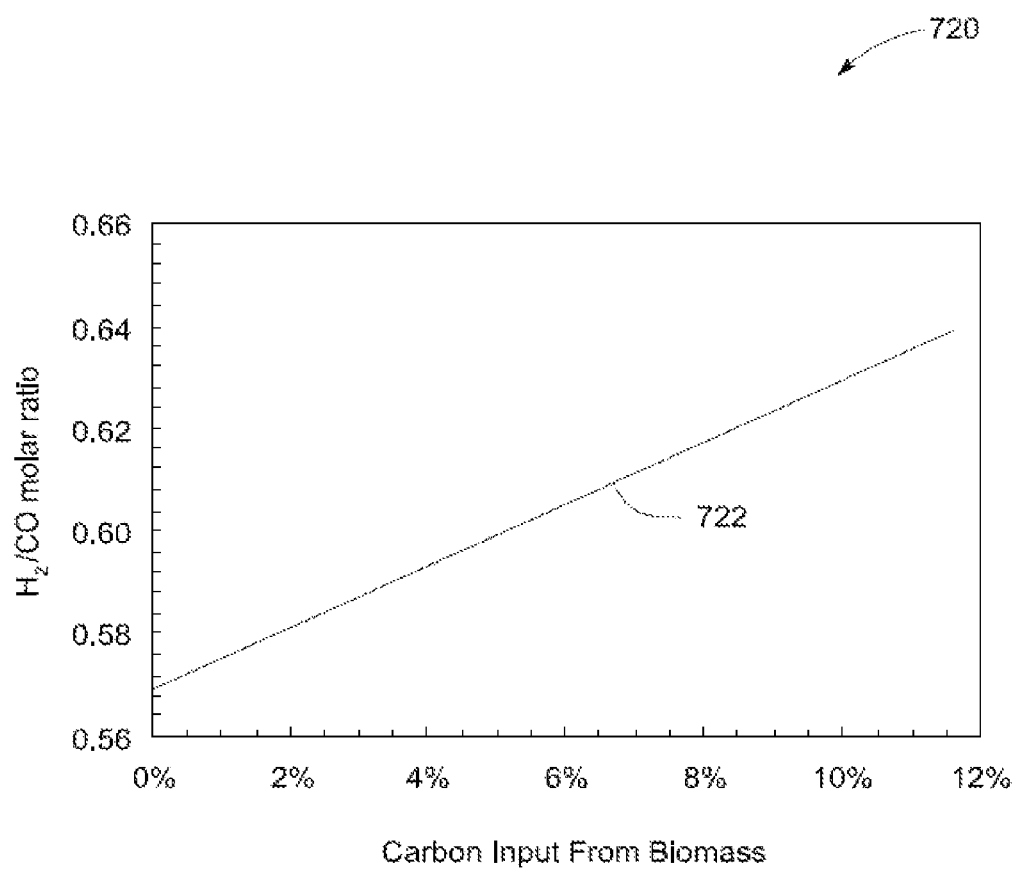

The results of the equilibrium calculations are summarized in FIGS. 14, 15 and 16 which show plots of various parameters as a function of carbon input coming from biomass. The values on X-axis are a measure of the mass ratio of the carbon content of LCV HOC feedstock 32 (biomass) to the total amount of carbon, injected into the gasifier (the sum of carbon contents of LCV HOC feedstock 32 and HCV feedstock 22.

FIG. 14 shows a plot 700 of calculated mass flow rates of coal, oxygen, (primary Y axis) and moderating steam (secondary Y axis) as functions of carbon input coming from biomass (X-axis). Line 702 shows the oxygen flow rate, line 704 shows the coal flow rate, and line 706 shows steam flow rate. As seen clearly from graph 700, the oxygen flowrate reduces as the percentage of the total carbon supplied by the LCV HOC feedstock flowrate is increased. This leads to the cost savings due to reduced ASU (air separation unit) requirements, as described in preceding section. Requirement for moderating steam flow, as shown by line 706 also reduces with the amount of biomass fed into the gasifier. This clearly shows the effect of the moisture content of the LCV HOC feedstock 32. The reduction in steam requirement for gasification leads to further cost savings. As seen from the graph 700, these savings increase with increasing biomass flowrate into the gasifier.

FIG. 15 shows a graph 710 of the required steam and oxygen flow rates relative to the base case (coal only) (primary Y axis) as well as calculated IGCC plant efficiency on HHV basis (secondary Y axis). Line 712 shows the oxygen flow rate, line 714 shows the steam flow rate and line 716 shows the overall IGCC plant efficiency on HHV basis. As the biomass flowrate (% of total Carbon input) is increased, the oxygen and steam requirement of the gasifier reduce as compared to the base case of pure coal gasification. The overall IGCC plant efficiency also increases as seen from line 716.

FIG. 16 depicts plot 720 illustrating the molar ratio (H2/CO) of the produced syngas. Line 722 clearly shows the increasing trend in the H2/CO molar ratio, with increasing amount of biomass fed into the gasifier. Higher hydrogen in the product syngas corresponds to higher energy content (calorific value) of the product syngas. The H:C ratio is an important parameter in the chemical synthesis applications of syngas. A higher H:C ratio is often desired for the synthesis process downstream of the gasifier. In common practice, increased amounts of steam injection are used to increase the H:C ratio of the syngas produced by the gasifier. The present invention provides for higher H:C ratio in the syngas by increasing the share of the LCV HOC feedstock fed to the gasifier, while achieving cost savings and reducing overall plant water consumption.

The next example shows the results of kinetic modeling of co-gasification process performed according to the embodiments of the present invention. Bituminous coal is used as the HCV feedstock 22 and biomass (soybean) is used as the LCV HOC feedstock 32. The composition of the feedstocks is shown in Table 4. The kinetic modeling is performed to evaluate the effect of injection of LCV HOC feedstock 32 such as biomass on reactive species distribution in zone II.

TABLE 4

Feedstocks used in kinetic modeling example

| Fuel Name | Bituminous Coal | Soybeans |
|---|---|---|
| Ultimate Analysis | | |
| C, wt % | 89.12 | 41.09 |
| H, wt % | 4.67 | 5.44 |
| N, wt % | 1.43 | 7.51 |
| S, wt % | 1.35 | 0.51 |
| Ash, wt % | 9.66 | 6.22 |
| O, wt % | 6.3 | 27.8 |
| H2O, wt % | 7.47 | 11.43 |
| Wet HV BTU/lb | 12,114 | 7,500 |
| Volatile, % | 45 | 70.42 |

It is known that the extent of gasification for such fuels as coal, biomass, and waste is defined by reactions between char and $H_2O$, $CO_2$, and active species present in the gas phase. The higher the concentration of gas phase active species such as radicals and reactive intermediates, the faster char gasification proceeds. The effect of fuel injection into multiple zones of the gasifier on the extent of the gasification reaction is evaluated by comparing concentrations of active gas phase species under different fuel injection configurations.

The chemical kinetic code ODF for "One Dimensional Flame" was employed to model gasification process. ODF treats gasifier reactor as a series of one-dimensional reactors. Each reactor may be perfectly mixed (well-stirred) or unmixed (plug-flow). Each ODF reactor may be assigned a variety of thermodynamic characteristics, including adiabatic, isothermal, or user-defined profiles of temperature, heat flux, and pressure. Process streams may be added over any interval of the plug flow reactor, with arbitrary mixing profiles along the reactor length. The flexibility in model setup allows for many different chemical processes to be simulated under a wide variety of mixing conditions.

The gasification process is treated as series of one or three plug-flow reactors depending on fuel injection configuration. Two fuel injection configurations were considered—in the first configuration, described by a single one plug-flow reactor, biomass and coal were injected at the same location along with $O_2$ (baseline case). In the second configuration coal and oxygen were injected in the initial stage of the gasification process, while biomass (20% by heat input) was injected with a delay of 0.2 seconds after coal injection as shown by point 736 on FIG. 17. The two-stage injection in the second configuration was modeled by three consecutive plug-flow reactors. Each reactor described one of the physical and chemical processes occurring in a gasifier: reactions of coal devolatilization products, addition of biomass devolatilization products, and gasification reactions of biomass devolatilization products. In both cases amount of injected biomass corresponded to 20% of the total heat input. Modeling was performed at temperature of 800 K, pressure of 1 atm, and oxygen-to-fuel molar ratio of 0.4.

Figure 17:
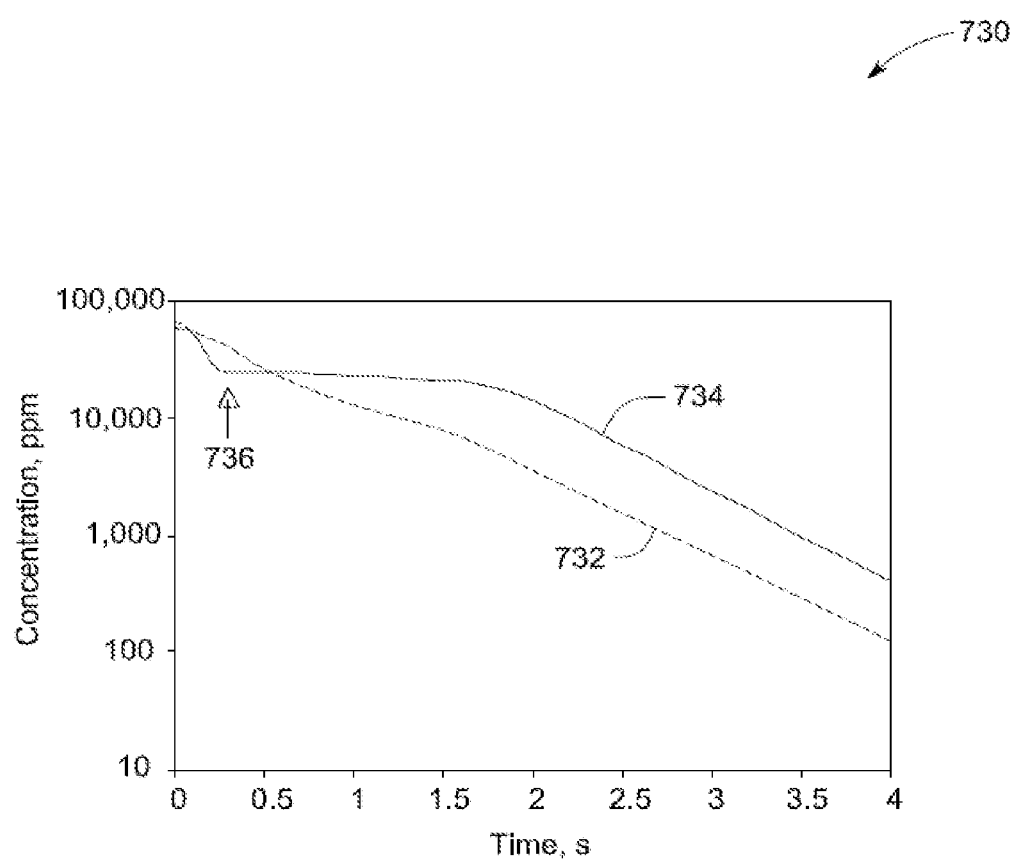
FIG. 17 shows results of kinetic modeling of the gasifier according to one embodiment of the present invention.

The results of kinetic modeling are shown in FIG. 17, which displays a plot 730 of total concentration of oxygen-containing active species (OH, HO2, and H2O2) present in the highest concentration in product syngas (shown as Y axis) as a function of time for baseline (one step injection) shown as line 732 and two-staged injection, shown as line 734.

FIG. 17 shows that in the baseline configuration concentration of active species due to partial oxidation of devolatilization products are high at the beginning of the process and then steadily decrease with time. Within one second after beginning of the gasification process the concentrations of active species decrease by approximately one order of magnitude. In two-step fuel injection case the concentrations of active species also decrease quickly after initial injection. However, biomass oxygen content released in the second stage results in additional production of the oxygen-containing active species (OH, HO2, and H2O2). In the baseline case all oxygen is already consumed by that time and no additional active species are generated.

In the two-step injection case the concentrations of active species also begin to fall after oxygen contained in biomass devolatilization products is consumed. However, concentrations of active species remain approximately three times higher than those in the baseline case.

Char gasification is a relatively slow process and thus occurs over longer period of time than reactions of the gas-phase devolatilization products. Since in two-step injection case concentrations of active species are higher than those during base case (except for few hundred milliseconds at the beginning of the gasification process), the char gasification is more complete in two-step case than in base case (monogasification of coal).

While described calculations were conducted at 800 K and 1 atm, the basic trends of the process are expected to remain the same as temperature and pressure increase. Although changes in coal and biomass composition affect concentrations of active species during gasification process, the main conclusions derived from these calculations remain valid: two-step injection of coal and biomass lead to increased concentrations of active species over substantial period of time and thus results in more complete char gasification than one-step injection.

A Computational Fluid Dynamics (CFD) modeling of gasifier performance was conducted for coal-only case (base case) and co-gasification of woody biomass and coal. Thus, in this example, coal is the HCV feedstock 22 and woody biomass is the LCV HOC feedstock 32. Ultimate and proximate analyses of the fuels used in this example are shown in Table 5. Chemical compositions in the gasifier were calculated assuming simplified kinetic rate expressions taken from open literature. Higher reactivity of biomass was accounted for by assigning higher gasification kinetic rates than those used to describe coal gasification.

TABLE 5

Analysis of Fuels used in CFD modeling Example

| | Coal | Biomass |
|---|---|---|
| Proximate Analysis | | |
| Moisture | 11.00 | 6.90 |
| Fixed Carbon (dry basis) | 50.28 | 20.84 |
| Volatile Matter (dry basis) | 40.09 | 77.06 |
| Ash (dry basis) | 9.63 | 2.11 |
| Total (dry basis) | 100.0 | 100.0 |
| Ultimate Analysis (dry basis) | | |
| C | 71.78 | 48.36 |
| H | 4.84 | 5.97 |
| O | 9.15 | 42.44 |
| N | 1.56 | 0.97 |
| S | 3.04 | 0.16 |
| Ash | 9.63 | 2.10 |
| Total | 100.0 | 100.0 |

Table 6 lists the input streams to the gasifier, as well as calculated syngas product temperature, hydrogen and carbon monoxide mass flow rates, and H2/CO ratios. Base case of Table 6 corresponds to fuel input comprised of 100% coal injected as coal-water slurry into the gasifier (conventional gasifier). Similar to the first example, Cases 1 and 2 have a total elemental carbon input same as the base case, and 20% of the carbon input is in the form of LCV HOC feedstock—woody biomass.

TABLE 6

CFD Modeling Results

| Case | | Base | Case 1 | Case 2 |
|---|---|---|---|---|
| Coal | kg/s | 26.91 | 22.6 | 21.93 |
| Wood | kg/s | 0 | 8.02 | 7.77 |
| Water | kg/s | 10.98 | 10.98 | 10.98 |
| Oxygen | kg/s | 21.5 | 21.5 | 18.85 |
| C | kg/s | 17.51 | 17.51 | 17.51 |
| O | kg/s | 36.08 | 38.73 | 36.08 |
| H | kg/s | 2.72 | 2.94 | 2.94 |
| $T_{out}$ | °C. | 1431 | 1512 | 1291 |
| $H_2$ | kg/s | 1.48 | 1.46 | 1.63 |
| CO | kg/s | 33.79 | 33.2 | 34.72 |
| $H_2$ + CO | mol/s | 1947 | 1916 | 2055 |
| $H_2$/CO | mol/mol | 0.61 | 0.62 | 0.66 |
| Carbon conversion | % | 98.2 | 98.89 | 97.75 |

Water input flow for cases 1 and 2 is kept the same as for the base case. Input oxygen mass flow in case 1 is the same as in the base case. The total elemental oxygen mass flow is calculated as a sum of oxygen content of coal and biomass fuels on dry basis, plus oxygen contained in the moisture (which in turn is a sum of moisture content of coal and biomass plus slurry water). As can be seen from Table 6, higher total elemental oxygen flow in case 1 results in higher gasifier temperatures and somewhat lower syngas production than the base case. The oxygen gas input in case 2 is reduced compared to the base case such as to maintain the same total elemental oxygen mass flow through the gasifier as in the base case. As shown in Table 6, this approach results in lower temperature Tout of calculated product stream. The operating temperatures of the entrained flow gasifiers typically need to be maintained in the range of 1200-1500° C. to achieve high carbon conversion and steady slag flow. Data from Table 6 shows that the product gas temperatures of both case 1 and case 2 are in this range, therefore, both cases 1 and 2 listed in Table 6 are practically feasible cases.

As can be seen from Table 6, case 2 allows the gasifier to operate in the proper temperature window while requiring approximately 12% less oxygen input by weight than the base case. H2+CO production in case 2 is higher (by ~5.5% on molar basis) than in the base case. Additionally, case 2 achieves higher H2/CO molar ratio in the product syngas, which might be beneficial for downstream energy or liquid fuel production.

The simplified kinetic model used in this example shows that carbon conversion for cases 1 and 2 is higher than the base case. By utilizing more comprehensive models that will allow better description of biomass-specific devolatilization and gasification kinetics, a substantially higher carbon conversion than in the base case can be demonstrated.

CFD modeling shows that the temperature of the gasifier reactor wall is more evenly distributed in both cases 1 and 2 as compared to the base case. More even wall temperature distribution is beneficial for gasifier operation since it reduces thermal stresses experienced by the refractory liner, leading to longer refractory lifetime and reduced maintenance costs associated with refractory replacement.

Results of particle tracking in the current CFD modeling show that injection of biomass particles into the slow-moving recirculation zone near the gasifier wall results in biomass residence times that are substantially longer than those for similarly sized coal particles. Combined with high biomass reactivity, longer residence time would lead to essentially complete conversion of biomass carbon to products.

Results of CFD modeling presented in this example confirm the benefits of co-gasification of coal (HCV feedstock) and biomass (LCV HOC feedstock). These case studies based on constant elemental carbon input to gasifier also suggest that a substantial amount of (high rank) coal can be replaced with cheaper feedstocks such as biomass, without affecting the gasifier performance and product syngas. The co-gasification according to embodiments of the present invention not only meets the operating conditions, it also increases the syngas quality also increases as evidenced by higher H2:CO ratio, a saving in operating and capital costs—such as due to lower oxygen requirements compared to coal-only base case. Additionally, refractory lining thermal stresses are reduced by optimized injection of lower heat content biomass fuel, leading to improved refractory lifetime and reduced maintenance costs.

The example clearly shows advantages of the multi-staged injection of the fuels as described by the embodiments of the present invention. The embodiments of present invention provide for separate injection of the HCV feedstock and the LCV HOC feedstock, thus avoiding co-injection issues. The embodiments of the present invention also provide for a gasifier that effectively uses moisture and oxygen content of the low-calorific-value feedstock. The multi-zone, multi-fuel gasifier is configured for a lower residence time of the LCV HOC feedstock, since it is highly reactive. The separate injection of the two feedstocks in separate zone allows for appropriate gasification temperature for each feedstock.

The embodiments of the present invention also provide for a method of operating this uniquely designed gasifier. The operation is characterized by separate injection of the two feedstocks in separate zones of the gasifier. The low-calorific-value feedstock is injected only after the oxidant injected in the first zone is substantially consumed. The embodiments also provide for various control schemes are available for controlling the operation of the gasifier without any operational problems. The embodiments result in optimum utilization of the feedstocks.

The operating method and the control schemes also enable retrofitting an existing coal gasifier to use multiple feedstocks in an efficient manner. The control strategies also enable smooth and efficient operation of the multizone gasifier.

The configurations and operation method for the gasifier described in the embodiments of the present invention provide for low CO2 emissions per unit weight of fuel, per unit amount of syngas or per unit amount of power produced etc. when biomass is used as a LCV HOC fuel, since biomass is considered as CO2 neutral, as discussed earlier.

The operation of gasifier according to embodiments of the present invention also result in lower operating costs due to factors less requirement of pure oxygen, larger particle size of LCV HOC feedstock used etc. The embodiments of present invention enable using larger particle size for the LCV HOC feedstock such as biomass, without adversely affecting conversion efficiency. The variation in the particle size is also used to achieve desired mixing of the feedstocks within the gasification zones. The operation of the gasifier can be controlled using the embodiments of the present invention, for reduced pollutant formation such as NOx. The flowability of slag can be improved leading to better operation and more reliability of the gasifier.

While only certain features of the invention have been illustrated and described herein, many modifications and changes will occur to those skilled in the art. The features described in various embodiments may be interchanged to form newer configurations. These features may be combined with already well-known configurations and operation strategies to achieve better performance. It is, therefore, to be understood that the appended claims are intended to cover all such modifications and changes as fall within the true spirit of the invention.

What is claimed is:

1. A method of reducing oxygen requirement of a coal gasifier, comprising:
   dividing said coal gasifier into two zones—a second zone located downstream of a first zone;
   providing at least one injector for injecting coal in a first zone, the at least one injector for injecting coal coupled to a source of coal;
   providing at least one injector for injecting an oxidant in the first zone, the at least one injector for injecting the oxidant coupled to a source of the oxidant, said second zone located downstream of said first zone and relative to said first zone such that the oxidant injected during operation is substantially consumed within said first zone;
   providing at least one injector for injecting steam in the first zone, the at least one injector for injecting steam coupled to a source of steam, and configured separate and apart from the at least one injector for injecting coal, and wherein the at least one injector for injecting coal is not coupled to the source of steam;
   devolatilizing a substantial portion of coal in said first zone to produce volatiles and coal char and partially combusting volatiles to produce heat for devolatization of coal and at least partially gasifying char in the presence of steam;
   providing at least one injector coupled to a source of low-calorific-value, high oxygen-content (LCV HOC) feedstock for injecting a low-calorific-value, high oxygen-content (LCV HOC) feedstock in a second zone;
   providing at least one injector for injecting steam in the second zone, the at least one injector for injecting steam coupled to a source of steam, and configured separate and apart from the at least one injector for injecting the low-calorific-value, high oxygen-content (LCV HOC) feedstock, and wherein the at least one injector for injecting the low-calorific-value, high oxygen-content (LCV HOC) feedstock is not coupled to the source of steam;
   devolatilizing said low-calorific-value, high oxygen-content (LCV HOC) feedstock in said second zone to generate oxygen containing compounds from said low-calorific-value, high oxygen-content (LCV HOC) feedstock; and
   gasifying at least a portion of said coal char with said oxygen containing compounds and steam in the second zone.

2. The method of claim 1, wherein said coal gasifier is further divided in a third zone, wherein said third zone is provided with another low-calorific-value, high oxygen-content feedstock that provides for additional oxygen generating compounds for gasification of said coal char.

3. The method of claim 1, wherein said method results in about 10% reduction in oxygen requirement.

4. The method of claim 1, wherein ash content of said coal and said low-calorific-value, high oxidant content feedstock form slag with improved flowability characteristics than the slag formed in monogasification of said coal to produce a same amount of syngas.

5. A method of operating a coal gasifier to generate syngas with a higher H:C ratio in the product gas compared to monogasification of coal, comprising:
   dividing said coal gasifier into two zones—a second zone located downstream of a first zone;
   providing at least one injector coupled to a source of coal for injecting coal in a first zone;
   providing at least one injector for injecting an oxidant in the first zone, the at least one injector for injecting the oxidant coupled to a source of the oxidant, said second zone located downstream of said first zone and relative to said first zone such that the oxidant injected during operation is substantially consumed within said first zone;
   providing at least one injector for injecting steam in the first zone, the at least one injector for injecting steam coupled to a source of steam, and configured separate and apart from the at least one injector for injecting coal, and wherein the at least one injector for injecting coal is not coupled to the source of steam;
   devolatilizing a substantial portion of coal in said first zone to produce volatiles and coal char and partially combusting volatiles to produce heat for devolatilization of coal and at least partially gasifying char in the presence of steam;
   providing at least one injector coupled to a source of low-calorific-value, high oxygen-content (LCV HOC) feedstock for injecting a low-calorific-value, high oxygen-content (LCV HOC) feedstock in a second zone for injecting a low-calorific-value (LCV), high oxygen-content feedstock in a second zone;
   providing at least one injector for injecting steam in the second zone, the at least one injector for injecting steam coupled to a source of steam, and configured separate and apart from the at least one injector for injecting the low-calorific-value, high oxygen-content (LCV HOC) feedstock, and wherein the at least one injector for injecting the low-calorific-value, high oxygen-content (LCV HOC) feedstock is not coupled to the source of steam;
   devolatilizing said low-calorific-value, high oxygen-content (LCV HOC) feedstock in said second zone to generate oxygen containing compounds, LCV volatiles and LCV char from said low-calorific-value, high oxygen-content (LCV HOC) feedstock;
   gasifying at least a portion of said coal char with said oxygen containing compounds and steam in the second zone; and
   gasifying said LCV volatiles and LCV char in the second zone to produce syngas in addition to syngas from gasification from coal.

6. The method of claim 5, wherein said coal gasifier is further divided in a third zone, wherein said third zone is provided with another low-calorific-value, high oxygen-content feedstock that provides for additional oxygen generating compounds for gasification of said coal char.

7. The method of claim 5, wherein said method results in about 10% reduction in oxygen requirement.

8. The method of claim 5, wherein ash content of said coal and said low-calorific-value, high oxidant content feedstock form slag with improved flowability characteristics than the slag formed in monogasification of said coal to produce a same amount of syngas.

9. The method of operating a coal gasifier comprising:
dividing said coal gasifier into two zones—a second zone located downstream of a first zone;
providing at least one injector coupled to a source of coal for injecting coal in a first zone;
providing at least one injector for injecting an oxidant in the first zone, the at least one injector for injecting the oxidant coupled to a source of the oxidant, said second zone located downstream of said first zone and relative to said first zone such that the oxidant injected during operation is substantially consumed within said first zone;
providing at least one injector for injecting steam in the first zone, the at least one injector for injecting steam coupled to a source of steam, and configured separate and apart from the at least one injector for injecting coal, and wherein the at least one injector for injecting coal is not coupled to the source of steam;
devolatilizing a substantial portion of coal in said first zone to produce volatiles and coal char and partially combusting volatiles to produce heat for devolatilization of coal and at least partially gasifying char in the presence of steam;
providing at least one injector coupled to a source of low-calorific-value, high oxygen-content (LCV HOC) feedstock for injecting a low-calorific-value, high oxygen-content (LCV HOC) feedstock in a second zone;
providing at least one injector for injecting steam in the second zone, the at least one injector for injecting steam coupled to a source of steam, and configured separate and apart from the at least one injector for injecting the low-calorific-value, high oxygen-content (LCV HOC) feedstock, and wherein the at least one injector for injecting the low-calorific-value, high oxygen-content (LCV HOC) feedstock is not coupled to the source of steam;
devolatilizinq said low-calorific-value, high oxygen-content (LCV HOC) feedstock in said second zone to generate oxygen containing compounds, LCV volatiles and LCV char from said low-calorific-value, high oxygen-content (LCV HOC) feedstock;
gasifying at least a portion of said coal char with said oxygen containing compounds and steam in the second zone; and
producing syngas from the gasification of said coal and said low-calorific-value, high-oxidant content (LCV HOC) feedstock.

10. The method of claim 9, wherein said coal gasifier is further divided in a third zone, wherein said third zone is provided with another low-calorific-value, high oxygen-content feedstock that provides for additional oxygen generating compounds for gasification of said coal char.

11. The method of claim 9, wherein said method results in about 10% reduction in oxygen requirement.

12. A method of increasing carbon conversion in a coal gasifier, comprising:
dividing said coal gasifier into two zones—a second zone located downstream of a first zone;
providing at least one injector coupled to a source of coal for injecting coal in a first zone;
providing at least one injector for injecting an oxidant in the first zone, the at least one injector for injecting the oxidant coupled to a source of the oxidant, said second zone located downstream of said first zone and relative to said first zone such that the oxidant injected during operation is substantially consumed within said first zone;
providing at least one injector for injecting steam in the first zone, the at least one injector for injecting steam coupled to a source of steam, and configured separate and apart from the at least one injector for injecting coal, and wherein the at least one injector for injecting coal is not coupled to the source of steam;
devolatilizing a substantial portion of coal in said first zone to produce volatiles and coal char and partially combusting volatiles to produce heat for devolatilization of coal and at least partially gasifying char in the presence of steam;
providing at least one injector coupled to a source of low-calorific-value, high oxygen-content (LCV HOC) feedstock for injecting a low-calorific-value, high oxygen-content (LCV HOC) feedstock in a second zone;
providing at least one injector for injecting steam in the second zone, the at least one injector for injecting steam coupled to a source of steam, and configured separate and apart from the at least one injector for injecting the low-calorific-value, high oxygen-content (LCV HOC) feedstock, and wherein the at least one injector for injecting the low-calorific-value, high oxygen-content (LCV HOC) feedstock is not coupled to the source of steam;
devolatilizing said low-calorific-value, high oxygen-content (LCV HOC) feedstock in said second zone to generate oxygen containing compounds from said low-calorific-value, high oxygen-content (LCV HOC) feedstock; and
gasifying at least a portion of said coal char with said oxygen containing compounds and steam in the second zone to increase the extent of gasification of said coal char as compared to monogasification of said coal.

13. The method of claim 12, wherein ash content of said coal and said low-calorific-value, high oxidant content feedstock form slag with improved flowability characteristics than the slag formed in monogasification of said coal to produce a same amount of syngas.

14. The method of claim 12, wherein said coal gasifier is further divided in a third zone, wherein said third zone is provided with another low-calorific-value, high oxygen-content feedstock that provides for additional oxygen generating compounds for gasification of said coal char.

15. The method of claim 12, wherein said method results in about 10% reduction in oxygen requirement.

* * * * *